(12) United States Patent
Hite et al.

(10) Patent No.: US 7,673,030 B2
(45) Date of Patent: *Mar. 2, 2010

(54) INTERNET CONTROL SYSTEM COMMUNICATION PROTOCOL, METHOD AND COMPUTER PROGRAM

(75) Inventors: Thomas D. Hite, Rockwall, TX (US);
Ronald W. Barber, Plano, TX (US);
Charles W. Partridge, Wylie, TX (US);
Mark R. Lee, Richardson, TX (US);
William B. McGrane, Dallas, TX (US);
Aaron L. Myer, Draper, UT (US);
Mark S. Lewno, Garland, TX (US)

(73) Assignee: AMX LLC, Richardson, TX (US)

( * ) Notice: Subject to any disclaimer, the term of this patent is extended or adjusted under 35 U.S.C. 154(b) by 131 days.

This patent is subject to a terminal disclaimer.

(21) Appl. No.: 11/601,041

(22) Filed: Nov. 17, 2006
(Under 37 CFR 1.47)

(65) Prior Publication Data
US 2008/0059622 A1 Mar. 6, 2008

Related U.S. Application Data

(63) Continuation of application No. 09/561,105, filed on Apr. 28, 2000, now Pat. No. 7,213,061.

(60) Provisional application No. 60/131,605, filed on Apr. 29, 1999.

(51) Int. Cl.
*G06F 15/173* (2006.01)
(52) U.S. Cl. ........................ 709/223; 709/220; 370/254; 370/338; 370/401; 370/359; 370/389

(58) Field of Classification Search ................. 709/223, 709/220; 370/254, 338, 401, 359, 389
See application file for complete search history.

(56) References Cited

U.S. PATENT DOCUMENTS 3,597,743 A   8/1971   Murphy et al.

(Continued)

FOREIGN PATENT DOCUMENTS

EP   0449632 A2   10/1991

(Continued)

OTHER PUBLICATIONS 10.4" Color LCD Tiltscreens, Oct. 1997, p. 1-2.

(Continued)

*Primary Examiner*—Tammy T Nguyen
(74) *Attorney, Agent, or Firm*—Gardere Wynne Sewell LLP; Karl L. Larson

(57) ABSTRACT

A control system, method and computer program are provided for communicating control information in a control system. The control system includes a master controller and a plurality of devices. Each of the plurality of devices have a number of channels. Each channel has an identifying number and a plurality of channel states. The method includes at least initially directing one or more messages sent to and from each device to the master controller, sending a first type of control message from the master controller to respective devices, and sending a second type of control message and a third type of control message from the master controller to respective devices. A control message of the first type directs the respective device to place one of its channels in a specified channel state. A control message of the second type directs the respective device to set the level of a specified parameter to a certain value, and a control message of the third type comprises a character string of variable length.

33 Claims, 10 Drawing Sheets

U.S. PATENT DOCUMENTS

| | | |
|---|---|---|
| 3,778,542 A | 12/1973 | Hanseman |
| 4,024,505 A | 5/1977 | Sperling |
| 4,251,858 A | 2/1981 | Cambigue et al. |
| 4,503,497 A | 3/1985 | Krygowski et al. |
| 4,530,069 A | 7/1985 | Desrochers |
| 4,700,230 A | 10/1987 | Pshtissky et al. |
| 4,790,003 A | 12/1988 | Kepley et al. |
| 4,876,651 A | 10/1989 | Dawson et al. |
| 4,882,747 A | 11/1989 | Williams |
| 4,904,993 A | 2/1990 | Sato |
| 4,914,527 A | 4/1990 | Asai et al. |
| 4,953,194 A | 8/1990 | Hansen et al. |
| 4,989,081 A | 1/1991 | Miyagawa et al. |
| 5,014,193 A | 5/1991 | Garner et al. |
| 5,039,980 A | 8/1991 | Aggers et al. |
| 5,051,720 A | 9/1991 | Kittirutsunetorn |
| 5,056,001 A | 10/1991 | Sexton |
| 5,072,374 A | 12/1991 | Sexton et al. |
| 5,086,385 A | 2/1992 | Launey et al. |
| 5,095,480 A | 3/1992 | Fenner |
| 5,103,391 A | 4/1992 | Barrett |
| 5,109,222 A | 4/1992 | Welty |
| 5,119,479 A | 6/1992 | Arai et al. |
| 5,144,548 A | 9/1992 | Salandro |
| 5,226,160 A | 7/1993 | Waldron et al. |
| 5,233,510 A | 8/1993 | Brueckner et al. |
| 5,276,630 A | 1/1994 | Baldwin et al. |
| 5,276,793 A | 1/1994 | Borgendale et al. |
| 5,311,451 A | 5/1994 | Barrett |
| 5,317,562 A | 5/1994 | Nardin et al. |
| 5,347,632 A | 9/1994 | Filepp et al. |
| 5,371,859 A | 12/1994 | Lennartsson |
| 5,375,248 A | 12/1994 | Lemay et al. |
| 5,388,213 A | 2/1995 | Oppenheimer et al. |
| 5,410,326 A | 4/1995 | Goldstein |
| 5,428,470 A | 6/1995 | Labriola, II |
| 5,434,982 A | 7/1995 | Calzi |
| 5,444,851 A | 8/1995 | Woest |
| 5,446,740 A | 8/1995 | Yien et al. |
| 5,450,359 A | 9/1995 | Sharma et al. |
| 5,452,291 A | 9/1995 | Eisenhandler et al. |
| 5,455,959 A | 10/1995 | Simmering |
| 5,463,735 A | 10/1995 | Pascucci et al. |
| 5,467,264 A | 11/1995 | Rauch et al. |
| 5,481,750 A | 1/1996 | Parise et al. |
| 5,491,797 A | 2/1996 | Thompson et al. |
| 5,491,802 A | 2/1996 | Thompson et al. |
| 5,500,794 A | 3/1996 | Fujita et al. |
| 5,510,975 A | 4/1996 | Ziegler, Jr. |
| 5,519,707 A | 5/1996 | Subramanian et al. |
| 5,519,875 A | 5/1996 | Yokoyama et al. |
| 5,528,215 A | 6/1996 | Siu et al. |
| 5,528,739 A | 6/1996 | Lucas et al. |
| 5,537,142 A | 7/1996 | Fenouil |
| 5,537,663 A | 7/1996 | Belmont et al. |
| 5,557,723 A | 9/1996 | Holt et al. |
| 5,565,855 A | 10/1996 | Knibbe |
| 5,565,908 A | 10/1996 | Ahmad |
| 5,568,367 A | 10/1996 | Park |
| 5,568,489 A | 10/1996 | Yien et al. |
| 5,570,085 A | 10/1996 | Bertsch |
| 5,572,643 A | 11/1996 | Judson |
| 5,583,994 A | 12/1996 | Rangan |
| 5,586,267 A | 12/1996 | Chatwani et al. |
| 5,592,626 A | 1/1997 | Papadimitriou et al. |
| 5,594,366 A | 1/1997 | Khong et al. |
| 5,600,635 A | 2/1997 | Hamaki et al. |
| 5,630,079 A | 5/1997 | McLaughlin |
| 5,634,011 A | 5/1997 | Auerbach et al. |
| 5,648,813 A | 7/1997 | Tanigawa et al. |
| 5,657,221 A | 8/1997 | Warman et al. |
| 5,675,756 A | 10/1997 | Benton et al. |
| 5,687,393 A | 11/1997 | Brown et al. |
| 5,689,353 A | 11/1997 | Darbee et al. |
| 5,699,532 A | 12/1997 | Barrett et al. |
| 5,706,455 A | 1/1998 | Benton et al. |
| 5,710,755 A | 1/1998 | Chen |
| 5,720,032 A | 2/1998 | Picazo, Jr. et al. |
| 5,721,878 A | 2/1998 | Ottesen et al. |
| 5,724,574 A | 3/1998 | Stratigos et al. |
| 5,729,704 A | 3/1998 | Stone et al. |
| 5,732,257 A | 3/1998 | Atkinson et al. |
| 5,737,529 A | 4/1998 | Dolin, Jr. et al. |
| 5,737,553 A | 4/1998 | Bartok |
| 5,739,760 A | 4/1998 | Hatakeyama |
| 5,740,231 A | 4/1998 | Cohn et al. |
| 5,742,762 A | 4/1998 | Scholl et al. |
| 5,754,255 A | 5/1998 | Takamori |
| 5,764,155 A | 6/1998 | Kertesz et al. |
| 5,805,812 A | 9/1998 | Fish et al. |
| 5,812,085 A | 9/1998 | Barraza et al. |
| 5,812,122 A | 9/1998 | Ng |
| 5,812,214 A | 9/1998 | Miller |
| 5,812,750 A | 9/1998 | Dev et al. |
| 5,815,516 A | 9/1998 | Aaker et al. |
| 5,815,703 A | 9/1998 | Copeland et al. |
| 5,819,294 A | 10/1998 | Chambers |
| 5,831,610 A | 11/1998 | Tonelli et al. |
| 5,835,126 A | 11/1998 | Lewis |
| 5,844,572 A | 12/1998 | Schott |
| 5,848,054 A | 12/1998 | Mosebrook et al. |
| 5,857,199 A | 1/1999 | Tamano et al. |
| 5,867,484 A | 2/1999 | Shaunfield |
| 5,886,894 A | 3/1999 | Rakoff |
| 5,892,924 A | 4/1999 | Lyon et al. |
| 5,896,382 A | 4/1999 | Davis et al. |
| 5,907,837 A | 5/1999 | Ferrel et al. |
| 5,909,570 A | 6/1999 | Webber |
| 5,910,954 A | 6/1999 | Bronstein et al. |
| 5,918,022 A | 6/1999 | Batz et al. |
| 5,920,694 A | 7/1999 | Carleton et al. |
| 5,922,050 A | 7/1999 | Madany |
| 5,926,187 A | 7/1999 | Kim |
| 5,935,003 A | 8/1999 | Stephens et al. |
| 5,940,387 A | 8/1999 | Humpleman |
| 5,943,064 A | 8/1999 | Hong et al. |
| 5,956,487 A | 9/1999 | Venkatraman et al. |
| 5,957,985 A | 9/1999 | Wong et al. |
| 5,959,536 A | 9/1999 | Chambers et al. |
| 5,968,116 A | 10/1999 | Day, II et al. |
| 5,977,989 A | 11/1999 | Lee et al. |
| 5,982,445 A | 11/1999 | Eyer et al. |
| 5,995,753 A | 11/1999 | Walker |
| 5,996,022 A | 11/1999 | Krueger et al. |
| 6,005,861 A | 12/1999 | Humpleman |
| 6,008,735 A | 12/1999 | Chiloyan et al. |
| 6,012,113 A | 1/2000 | Tuckner |
| 6,021,433 A | 2/2000 | Payne et al. |
| 6,023,762 A | 2/2000 | Dean et al. |
| 6,029,092 A | 2/2000 | Stein |
| 6,038,668 A | 3/2000 | Chipman et al. |
| 6,049,821 A | 4/2000 | Theriault et al. |
| 6,049,828 A | 4/2000 | Dev et al. |
| 6,052,683 A | 4/2000 | Irwin |
| 6,052,750 A | 4/2000 | Lea |
| 6,055,236 A | 4/2000 | Nessett et al. |
| 6,055,368 A | 4/2000 | Kunioka |
| 6,061,602 A | 5/2000 | Meyer |
| 6,061,717 A | 5/2000 | Carleton et al. |
| 6,075,776 A * | 6/2000 | Tanimoto et al. ............ 370/254 |
| 6,078,747 A | 6/2000 | Jewitt |
| 6,078,952 A | 6/2000 | Fielding et al. |
| 6,085,238 A | 7/2000 | Yuasa et al. |
| 6,085,243 A | 7/2000 | Fletcher et al. |

| | | |
|---|---|---|
| 6,088,717 A | 7/2000 | Reed et al. |
| 6,101,189 A | 8/2000 | Tsuruoka |
| 6,105,055 A | 8/2000 | Pizano et al. |
| 6,108,696 A | 8/2000 | Mendhekar et al. |
| 6,115,713 A | 9/2000 | Pascucci et al. |
| 6,121,593 A | 9/2000 | Mansbery et al. |
| 6,133,847 A | 10/2000 | Yang |
| 6,144,993 A | 11/2000 | Fukunaga et al. |
| 6,160,796 A | 12/2000 | Zou et al. |
| 6,161,133 A | 12/2000 | Kikinis |
| 6,161,145 A | 12/2000 | Bainbridge et al. |
| 6,167,567 A | 12/2000 | Chiles et al. |
| 6,175,920 B1 | 1/2001 | Schanze |
| 6,177,945 B1 | 1/2001 | Pleyer |
| 6,192,282 B1 | 2/2001 | Smith et al. |
| 6,195,688 B1 | 2/2001 | Caldwell et al. |
| 6,198,479 B1 | 3/2001 | Humpleman et al. |
| 6,199,133 B1 | 3/2001 | Schnell |
| 6,240,554 B1 | 5/2001 | Fenouil |
| 6,241,156 B1 | 6/2001 | Kline et al. |
| 6,259,707 B1 | 7/2001 | Dara-Abrams et al. |
| 6,260,069 B1 | 7/2001 | Anglin |
| 6,266,339 B1 | 7/2001 | Donahue et al. |
| 6,272,134 B1 | 8/2001 | Bass et al. |
| 6,288,716 B1 | 9/2001 | Humpleman et al. |
| 6,292,901 B1 | 9/2001 | Lys et al. |
| 6,310,879 B2 | 10/2001 | Zhou et al. |
| 6,330,238 B1 | 12/2001 | Ooe |
| 6,338,152 B1 | 1/2002 | Fera et al. |
| 6,342,906 B1 | 1/2002 | Kumar et al. |
| 6,360,270 B1 | 3/2002 | Cherkasova et al. |
| 6,363,422 B1 | 3/2002 | Hunter et al. |
| 6,415,328 B1 | 7/2002 | Korst |
| 6,434,157 B1 | 8/2002 | Dube' et al. |
| 6,434,680 B2 | 8/2002 | Belknap et al. |
| 6,437,691 B1 | 8/2002 | Sandelman et al. |
| 6,446,130 B1 | 9/2002 | Grapes |
| 6,456,699 B1 | 9/2002 | Burg et al. |
| 6,469,695 B1 | 10/2002 | White |
| 6,469,987 B1 | 10/2002 | Rijhsinghani |
| 6,477,569 B1 | 11/2002 | Sayan et al. |
| 6,484,061 B2 | 11/2002 | Papadopoulos et al. |
| 6,484,149 B1 | 11/2002 | Jammes et al. |
| 6,496,927 B1 | 12/2002 | McGrane et al. |
| 6,505,146 B1 | 1/2003 | Blackmer |
| 6,515,680 B1 | 2/2003 | Hendricks et al. |
| 6,523,696 B1 | 2/2003 | Saito et al. |
| 6,542,165 B1 | 4/2003 | Ohkado |
| 6,546,405 B2 | 4/2003 | Gupta et al. |
| 6,553,418 B1 | 4/2003 | Collins et al. |
| 6,574,234 B1 | 6/2003 | Myer et al. |
| 6,609,127 B1 | 8/2003 | Lee et al. |
| 6,615,088 B1 | 9/2003 | Myer et al. |
| 6,657,646 B2 | 12/2003 | Partridge et al. |
| 6,680,934 B1 | 1/2004 | Cain |
| 6,697,376 B1 | 2/2004 | Son et al. |
| 6,744,771 B1 | 6/2004 | Barber et al. |
| 6,760,760 B1 | 7/2004 | McGrane |
| 6,763,040 B1 | 7/2004 | Hite et al. |
| 6,775,654 B1 | 8/2004 | Yokoyama et al. |
| 6,783,040 B2 | 8/2004 | Batchelor |
| 6,791,554 B1 | 9/2004 | Mergard et al. |
| 6,801,529 B1 | 10/2004 | McGrane et al. |
| 6,829,368 B2 | 12/2004 | Meyer et al. |
| 6,865,596 B1 | 3/2005 | Barber et al. |
| 6,868,403 B1 | 3/2005 | Wiser et al. |
| 6,934,414 B2 | 8/2005 | Kondo et al. |
| 6,937,766 B1 | 8/2005 | Wilf et al. |
| 7,076,153 B2 | 7/2006 | Ando et al. |
| 7,213,061 B1 | 5/2007 | Hite et al. |
| 7,224,366 B2 | 5/2007 | Kessler et al. |
| 7,426,702 B2 | 9/2008 | Partridge et al. |
| 2002/0013948 A1 | 1/2002 | Aguayo et al. |
| 2002/0056047 A1 | 5/2002 | Lehman |
| 2002/0176601 A1 | 11/2002 | Rhoads |
| 2003/0035556 A1 | 2/2003 | Curtis et al. |
| 2003/0149574 A1 | 8/2003 | Rudman |
| 2004/0034864 A1 | 2/2004 | Barrett et al. |
| 2004/0044742 A1 | 3/2004 | Evron et al. |
| 2004/0075694 A1 | 4/2004 | Partridge et al. |
| 2004/0085361 A1 | 5/2004 | Kessler et al. |
| 2004/0196255 A1 | 10/2004 | Cheng |
| 2005/0273700 A1 | 12/2005 | Champion et al. |
| 2006/0067341 A1 | 3/2006 | Barber et al. |
| 2007/0055976 A1 | 3/2007 | Ward et al. |
| 2007/0211691 A1 | 9/2007 | Barber et al. |
| 2008/0313316 A1 | 12/2008 | Hite et al. |

FOREIGN PATENT DOCUMENTS

| | | |
|---|---|---|
| EP | 0530973 | 3/1993 |
| EP | 0626635 | 11/1994 |
| EP | 0658899 | 6/1995 |
| EP | 0743595 A2 | 11/1996 |
| EP | 0798894 | 10/1997 |
| EP | 0812086 | 12/1997 |
| EP | 0841615 | 5/1998 |
| EP | 0841616 | 5/1998 |
| EP | 0915469 | 5/1999 |
| EP | 0939517 | 9/1999 |
| EP | 1359482 A1 | 11/2003 |
| JP | 10040080 A | 2/1998 |
| JP | 10276478 | 10/1998 |
| WO | WO-9521415 A1 | 8/1995 |
| WO | WO-9624231 A1 | 8/1996 |
| WO | WO-9718636 A2 | 5/1997 |
| WO | WO-9726587 A1 | 7/1997 |
| WO | WO-9744747 | 11/1997 |
| WO | WO-9800788 A1 | 1/1998 |
| WO | WO-9811510 A1 | 3/1998 |
| WO | WO-9836335 A2 | 8/1998 |
| WO | WO-9836336 A1 | 8/1998 |
| WO | WO-9853581 A1 | 11/1998 |
| WO | WO-9903255 A1 | 1/1999 |
| WO | WO-9905584 | 2/1999 |
| WO | WO-9924905 | 5/1999 |
| WO | WO-0028403 A1 | 5/2000 |
| WO | WO-0067134 A1 | 11/2000 |
| WO | WO-0067135 | 11/2000 |
| WO | WO-0067140 A1 | 11/2000 |
| WO | WO-0067141 A1 | 11/2000 |
| WO | WO-0075738 | 12/2000 |
| WO | WO-0075767 A1 | 12/2000 |
| WO | WO-0075774 A2 | 12/2000 |
| WO | WO-0075870 A1 | 12/2000 |
| WO | WO-0075901 A2 | 12/2000 |
| WO | WO-0075903 | 12/2000 |
| WO | WO-0076123 A2 | 12/2000 |
| WO | WO-0076127 A1 | 12/2000 |
| WO | WO-0076169 A2 | 12/2000 |
| WO | WO-0076174 A1 | 12/2000 |
| WO | WO-0076207 A1 | 12/2000 |
| WO | WO-0076208 A2 | 12/2000 |
| WO | WO-2006029391 A2 | 3/2006 |
| WO | WO-2007030421 A2 | 3/2007 |

OTHER PUBLICATIONS 8.5" Touch Panels, Oct. 1995, p. 1-2.
Aether Software, "ScoutWeb™ Web-Enabling the Mobile Enterprise," http://www.riverbedtech.com/scoutware/index.phtml?i=sw, dated May 25, 2000; 11 pages.
AMX Celebrates Significant Dynamic Device Discovery Protocol Milestones at Infocomm 2006, Jun. 7, 2006, p. 1-2.
AMX Extends NetLinx™ With Java™ for Industry's First Dual Language Control, Sep. 10, 2004.

AMX Instruction Manual—Café Duet™ Integrated Development Environment for NetLinx Duet (Version 1.7)—User's Guide, Apr. 6, 2006, p. 1-2.
AMX Instruction Manual—Design XPress—Home Theater Version 1.2, Advanced Programmer's Guide, 2003, p. 1-36.
AMX Instruction Manual—Design XPress—Home Theater Version 1.3, On-Site Installer's Guide, 2005, p. 1-30.
AMX Instruction Manual—Design XPress—Home Theater Version 1.3, Programmer's Guide, 2005, p. 109.
AMX Instruction Manual—Design XPress—Home Theater Version 1.3, User Interface Guide, 2005, p. 1-43.
AMX Instruction Manual—Design XPress—Professional Version 1.1, On-Site Installer's Guide, 2004, p. 1-16.
AMX Instruction Manual—Design XPress—Professional Version 1.1, Programmer's Guide, Aug. 11, 2004, p. 153.
AMX Instruction Manual—Design XPress—Professional Version 1.1, User-Interface Guide, 2004, p. 1-43.
AMX Instruction Manual—Design XPress for NetLinx Studio Version 1.5, Programmer's Guide, 2005, p. 1-68.
AMX Instruction Manual—Design XPress for NetLinx Studio Version 1.5, User Interface Guide, 2005, p. 1-53.
AMX Instruction Manual—Design XPress for NetLinx Studio, On-Site Installer's Guide, 2002, p. 1-16.
AMX Instruction Manual—Design XPress for NetLinx Studio, Step-by-Step User's Guide, 2002, p. 1-32.
AMX Instruction Manual—Design XPress for NetLinx Studio, Version 1.5, Installer's Guide, 2005, p. 1-43.
AMX Instruction Manual—Standard NetLinx API (SNAPI) R 1.6.0, Dec. 19, 2005, 1-190.
AMX Partners With Leading Manufacturers to Leverage Dynamic Device Discovery Technology, Jun. 8, 2005, p. 1-3.
AMX Revolutionizes Touch Panel Interaction with Launch of TakeNote™ Interactive Collaboration Tool, Jun. 9, 2004, p. 1-2.
AXB-TPI/3 Touch Panel Interface 3, May 1999, p. 1-2.
AXCESS Language Tutorial—Version 2.1, Mar. 1993, p. 1-160.
Baier, et al., Multimedia Middleware for the Future Home, ACM, 2001, p. 48-51, entire reference.
Cellular Unlimited, "Cellular Unlimited Rogers AT&T..on Pagers and Wireless Web Browser," http://www.cantelamigo.com/blackberry.html, dated May 25, 2000, 5 pages.
Ceroview, "Touch Screens," internet website article located at: www.ceroview.com/peripherals/touchspecs/touchtech.html, dated May 11, 2004, 3 pages.
Cisco and Infoseek Align With Panja to Bring Rich Internet Content to 2 Billion Consumer Devices, Jul. 19, 1999, p. 1-3.
Comer, Douglas E., "Internetworking With TCP/IP" vol. I, Principles, Protocols, and Architecture, published 1995, pp. 89-94, 203-207 and 291-292 (1995).
Corcoran, P.M., et al, "CEBus Network Access via the World Wide Web," p. 236-237, IEE Transactions on Consumer Electronics, Aug. 1996.
Corcoran, Peter M., et al., "Browser-Style Interfaces to a Home Automation Network," IEEE Transactions on Consumer Electronics, vol. 43 (No. 4), p. 1063-1069 (Nov. 1, 1997).
"Crestron SpectrumTM STX-3500C 2 Way RF Wireless Touchscreen Control Panel," Crestron Remote Control Systems, Nov. 1997.
Cucos, Alexander, et al., "Real Time ATM for remote access to Home Automation and Digital Home A/V Networks," IEEE, vol. 44 (No. 3) p. 482-489 (Jun. 17, 1998).
Desbonnet, Joe, et al., "System Architecture and Implementation of a CEBus/Internet Gateway," IEEE Transactions on Consumer Electronics (New York), vol. 43 (No. 4), p. 1057-1062, XP-00076, Nov. 1, 1997.
Droms, R. "Dynamic Host Configuration Protocol," RFC 1541, Oct. 1993, pp. 1-34.
Gagnon F., et al., "On the Development of a Generic Interface for HLA and DIS Simulations," IEEE 1998, pp. 52-59, XP-002138396.
Global Connectivity Global WebLinx, 2000, p. 1-2.
Global WebLinx, 1999, p. 1-2.
Goodman, D., Chapter 10: All About Buttons, The Complete Hypercard Handbook, Bantam Computer Books (US), pp. 161-183; Dec. 19, 1988.
Gopal, Inder S., et al., Dynamic Address Assignment in Broadcast Networks' IEEE Transactions on Communications, vol. COM-34, No. 1, Jan. 1986, pp. 31-37 XP000811899.
Halsall, F., "Data Communications, Computer Networks and Open Systems," Addison-Wesley, p. 45-46 and 285-292 (1996)—XP-002162277.
Hedrick, C., "Routing Information Protocol," RFC 1058, Jun. 1988, pp. 1-29.
Hill Associates, Inc., "Remote Access and TCP/IP," Colchester, Vermont, dated Jan. 1998, pp. 616.3.1-616.3.11.
Instruction Manual—10.4" Touch Panels (Firmware Version G3), Jun. 2003, p. 1-67.
Instruction Manual—Mio R-1 Remote Control Device, Sep. 2005, p. 1-25.
Instruction Manual—VPXPress—ViewPoint System Design/Programming Software Program (Version 1.1 or higher), Jul. 2001, p. 1-37.
International Preliminary Examination Report Dated Feb. 24, 2001 from WO 2000/67135 (International App. No. PCT/US00/11796).
International Preliminary Examination Report Dated Apr. 10, 2001 from WO 2000/67134 (International App. No. PCT/US00/11797).
International Preliminary Examination Report Dated Jun. 5, 2001 from WO 2000/67141 (International App. No. PCT/US00/11853).
International Preliminary Examination Report Dated Jul. 4, 2001 from WO 2000/76208 (International App. No. PCT/US00/40160).
International Preliminary Examination Report Dated Jul. 7, 2001 from WO 2000/67140 (International App. No. PCT/US00/11851).
International Preliminary Examination Report Dated Sep. 4, 2001 from WO 2000/75767 (International App. No. PCT/US00/40097).
International Preliminary Examination Report Mailed Sep. 13, 2001 from WO 2000/75870 (International App. No. PCT/US00/15045).
International Preliminary Report on Patentability Dated Mar. 13, 2007 from WO 2006/029391 (International App. No. PCT/US05/32389).
International Preliminary Report on Patentability Dated Mar. 17, 2009 from WO 2007/030421 (International App. No. PCT/US06/34445).
International Search Report Mailed Jan. 22, 2001 from WO 2000/76123 (International App. No. PCT/US00/15631).
International Search Report Mailed Feb. 21, 2001 from WO 2000/75774 (International App. No. PCT/US00/15528).
International Search Report Mailed Mar. 14, 2001 from WO 2000/75903 (International App. No. PCT/US00/15762).
International Search Report Mailed Mar. 14, 2001 from WO 2000/76169 (International App. No. PCT/US00/15745).

International Search Report Mailed Mar. 21, 2001 from WO 2000/75901 (International App. No. PCT/US00/15742).
International Search Report Mailed Jul. 6, 2000 from WO 2000/67140 (International App. No. PCT/US00/11851).
International Search Report Mailed Jul. 9, 2008 from WO 2007/030421 (International App. No. PCT/US06/34445).
International Search Report Mailed Jul. 28, 2000 from WO 2000/67134 (International App. No. PCT/US00/11797).
International Search Report Mailed Aug. 29, 2000 from WO 2000/67141 (International App. No. PCT/US00/11853).
International Search Report Mailed Sep. 14, 2000 from WO 2000/67135 (International App. No. PCT/US00/11796).
International Search Report Mailed Sep. 19, 2000 from WO 2000/76207 (International App. No. PCT/US00/15620).
International Search Report Mailed Sep. 26, 2000 from WO 2000/75738 (International App. No. PCT/US00/15485).
International Search Report Mailed Sep. 27, 2000 from WO 2000/75767 (International App. No. PCT/US00/40097).
International Search Report Mailed Oct. 23, 2000 from WO 2000/76127 (International App. No. PCT/US00/14908).
International Search Report Mailed Oct. 26, 2000 from WO 2000/76174 (International App. No. PCT/US00/14898).
International Search Report Mailed Nov. 14, 2006 from WO 2006/029391 (International App. No. PCT/US05/32389).
International Search Report Mailed Nov. 15, 2000 from WO 2000/75870 (International App. No. PCT/US00/15045).
International Search Report Mailed Dec. 1, 2000 from WO 2000/76208 (International App. No. PCT/US00/40160).
Khosia R., "Human-centered virtual machine of problem solving agents, software agents, intelligent agents . . . ", IEEE High-Assurance Sys. Eng. Symp., pp. 312-319, Nov. 1998.
Klesper, Tilo, "Der Internet-Zugriff aufs LON/Weltweiter Zugriff auf die Sensorik und Aktorik von Automatisierungs—Projekten," Elektronik (Germany), vol. 47 (No. 8), p. 60, 62, 64 and 66-68 (Aug. 1998), with unverified translation obtained.
Landmark Designer—Instruction Manual—Preliminary, Oct. 2000, p. 1-225.
Landmark Designer 2.2 User Guide (Preliminary Copy), Mar. 1, 1999, p. 1-287.
Loucks, E. M., et al., "Implementation of a Dynamic Address Assignment Protocol in a Local Area Network" Computer networks and ISDN Sys., vol. 11, No. 2, Feb. 1986, pp. 133-146.
Mapquest Corporate: Copyright Information, internet website article located at: wysiwyg://89http://mapquest.c..ght&uid=udu49aj5i058jble:b51f7w5u2, dated May 25, 2000, 10 pages.
Microsoft Winhec, Intel Development Tool for Implementing UPnP Devices, Microsoft Corp., 2003, p. 1-14, entire reference.
Mio R-1 Remote, Sep. 2005, p. 1-2.
NetLinx CardFrame, Control Cards, and NetModules—Instruction Manual—Preliminary May 2000, p. 1-49.
NetLinx Duet—Inconcert Partner Benefits, Sep. 2004.
NetLinx Duet, Sep. 2004.
NetLinx Hub Cards and Modules—Instruction Manual, Mar. 2000, p. 1-30.
NetLinx Master Cards and Modules—Instruction Manual—Preliminary, May 2000.
NetLinx Master Firmware—Version 3.0, Sep. 10, 2004, p. 1-34.
NetLinx Programming Language—Instruction Manual, May 2000, p. 1-184.
NetLinx Quick Setup Guide, Jun. 2000, p. 1-2.
New Products Infocomm '98, Jun. 1998, p. 1-20.
Nusser, et al., "The Java CAN API—a Java Gateway to Fieldbus Communication," Sep. 2000, IEEE.
NXI NetLinx Integrated Controller—Integrated Controllers—Instruction Manual—Preliminary, Nov. 2000, p. 1-35.
Omni Sky: Products and Services: Web "All the Web You Want," http://secure.omnisky.com/products...d$LGPZLPIAAAJLTQFINQSFEWAVBWAYIV0, dated May 25, 2000, 9 pages.
OSGI Alliance, "About the OSGI Service Platform—Technical Whitepaper" pamphlet dated Jul. 12, 2004, Revision 3.0, 17 pages.
OSGI Alliance, "OSGI Technology" internet website article located at: http://www.osgi.or/osgi_technology/index.asp?section=2, dated Aug. 6, 2004, 5 pages.
Palm OS®, "Web Clipping Development," internet website article located at: http://www.palmos.com/dev/tech/webclipping/, dated May 25, 2000, 18 pages.
Palm, Inc., "Web Clipping, Not Web Browsing," http://www.palm.com/products/palmvii/webclipping.html, dated May 25, 2000; 4 pages.
Panja Announces First Shipments of Panja 1000 Units, Jan. 24, 2000, p. 1-2.
Panja Ethernet Gateway, May 2000, p. 1-2.
Panja WebLinx Administrator Program (Version 1.0 or higher) Instruction Manual, Oct. 1999, p. 1-41.
Panja WebLinx Server and Internet Development Kit (IDK) (Version 1.02 or higher) Instruction Manual, Oct. 1999, p. 1-71.
Panja, "What is the Panja 1000?" internet website article located at: wysiwyg://33/http://www.buyapanja.com/, dated May 25, 2000, 3 pages.
Powered by AXlink, Oct. 1997, p. 1-16.
Quick Start Guide—AXB-TPI/3—Touch Panel Interface 3, Oct. 2002, p. 1-2.
Quick Start Guide—Mio R-1 Remote Control Device, Sep. 2005, p. 1-2.
Quick Start Guide, NXA-USBTN G4 USB Computer Control Stick with TakeNote, Jun. 9, 2004, p. 1-2.
Research in Motion Ltd., "BlackBerry Technical White Paper," Version 1.0, dated 1998-1999, 17 pages.
Tanenbaum, Andrew, "Computer Networks," Prentice Hall International (London), p. 345-403 (1996); XP-002155220.
Tindell, K., "Guaranteeing Message Latencies on Control Area Network (CAN)," Proceedings of the 1st CAN International Conference, p. 1-11.
TPDesign3—Touch Panel Design Program (Version 3.16), Dec. 2002, p. 1-47.
Tsuchiya, P.F., "Efficient Utilization of Two-Level Hierarchical Addresses," IEEE, vol. -, Dec. 6, 1992, pp. 1016-1021, XP000357710 ISBN: 0-7803-0608-2.
U.S. Appl. No. 09/328,032 entitled, "Method and System for Dynamically Assigning . . . " filed Jun. 8, 1999; Inventor: Barber et al., Abandoned.
U.S. Appl. No. 09/328,922 entitled "System and Method for Monitoring Video Inputs" filed Jun. 9, 1999; Inventor: Aaron Myer, Abandoned.
U.S. Appl. No. 09/328,923 entitled "System and Method for Integrating Multiple Video Switches into a Video Matrix", filed Jun. 9, 1999; Inventor: Aaron Myer et al., Abandoned.
U.S. Appl. No. 09/561,103 entitled "Dynamic Messaging System and Method" filed Apr. 28, 2000; Inventor: Thomas D. Hite et al., Abandoned.

U.S. Appl. No. 09/561,104 entitled "Internet Application Control System and Method" filed Apr. 28, 2000; Inventor: Thomas D. Hite, Abandoned.

U.S. Appl. No. 09/589,576 entitled "Method and System for Providing Access . . ." filed Jun. 7, 2000; Inventor: Thomas D. Hite, Abandoned.

U.S. Appl. No. 09/696,802, entitled "System and Method of Mining World Wide Web Content" filed Oct. 25, 2000, Inventor: Subramanian et al., Abandoned.

U.S. Appl. No. 60/715,252 entitled "Method and Computer Program for Device Configuration" filed Sep. 7, 2005; Inventors: Robert D. Ward et al., Expired.

U.S. Appl. No. 60/715,330 entitled "Remote Control With Power Management" filed Sep. 7, 2005; Inventor: Michael S. Farmer et al., Expired.

Reissue U.S. Appl. No. 11/219,300 entitled "System and Method of Device Interface Configuration for Control System" filed Sep. 2, 2005; Inventor: Aaron L. Myer et al.

University of Michigan, The Device Builder Module, www.eecs.umich.edu, Jul. 1997, pp. 1-6, entire reference.

Viewpoint Wireless Touch Panel, Jun. 1998, p. 1-2.

Wang, Qunjie, et al., "EM-an environment manager for building networked virtual environments" IEEE Virtual Reality Annual Intern. Symp., pp. 11-18, Mar. 1995.

Written Opinion Mailed Mar. 13, 2001 from WO 2000/75870 (International App. No. PCT/US00/15045).

Written Opinion Mailed Jul. 9, 2008 from WO 2007/030421 (International App. No. PCT/US06/34445).

Written Opinion Mailed Nov. 14, 2006 from WO 2006/029391 (International App. No. PCT/US05/32389).

Yahoo! Terms of Service, internet website article located at: http://docs.yahoo.com/info.terms/, dated May 25, 2000, 9 pages.

* cited by examiner

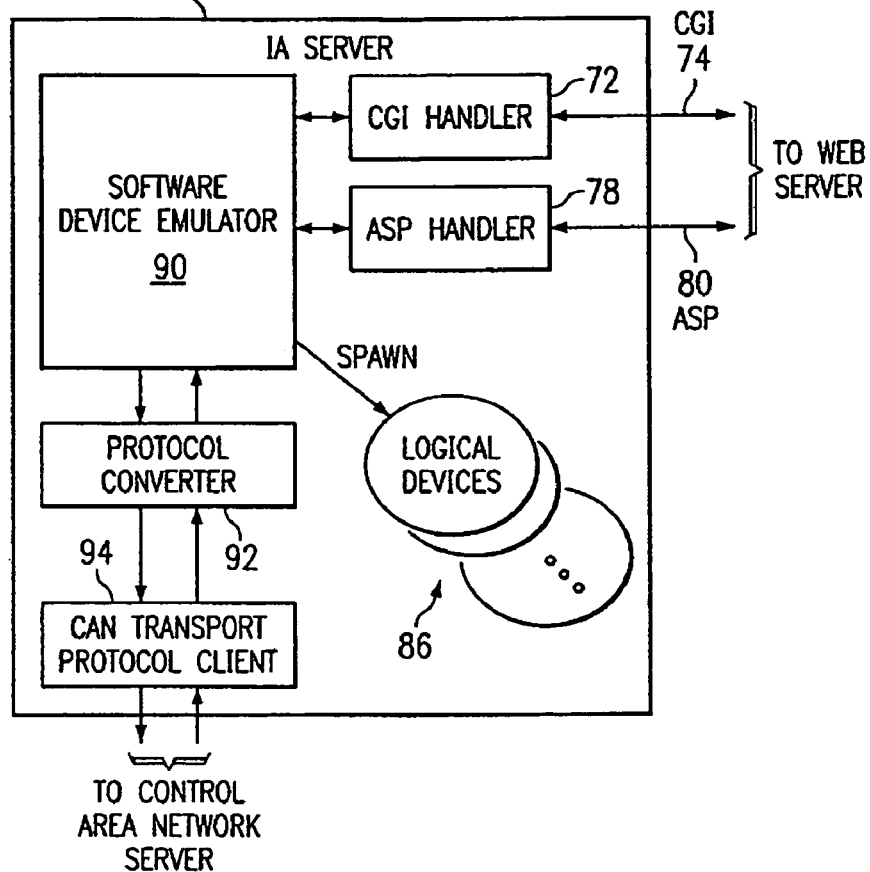
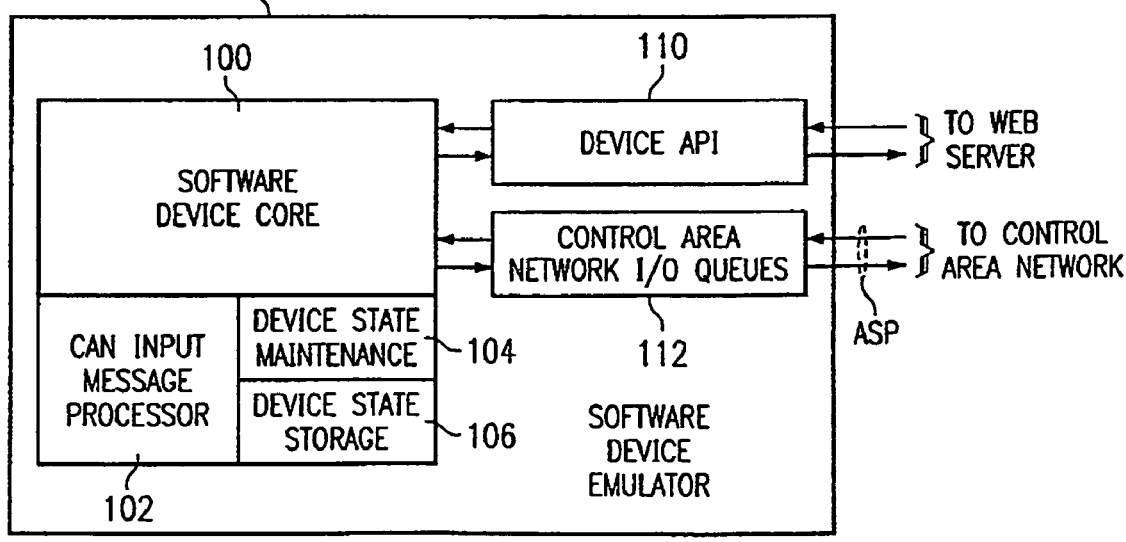

| FIELD | SIZE (BYTES) |
|---|---|
| 670 PROTOCOL FIELD | 1 |
| 672 LENGTH OF DATA | 2 |
| 674 FLAGS | 1 |
| 676 DESTINATION SYSTEM | 2 |
| 678 DESTINATION DEVICE | 2 |
| 680 DESTINATION PORT | 2 |
| 682 SOURCE SYSTEM | 2 |
| 684 SOURCE DEVICE | 2 |
| 686 SOURCE PORT | 2 |
| 688 ALLOWED HOP COUNT | 1 |
| 690 MESSAGE ID | 2 |
| 692 MESSAGE COMMAND | 2 |
| 694 MESSAGE DATA | 4 |
| 696 CHECKSUM | 1 |

US 7,673,030 B2

INTERNET CONTROL SYSTEM COMMUNICATION PROTOCOL, METHOD AND COMPUTER PROGRAM

CROSS REFERENCE TO RELATED APPLICATIONS

The present application is a continuation of and claims priority to U.S. patent application Ser. No. 09/561,105, entitled "Internet Control System and Method," filed in the U.S. Patent and Trademark Office on Apr. 28, 2000 now U.S. Pat. No. 7,213,061 and having a common inventor as the present document, which claims priority to U.S. provisional application Ser. No. 60/131,605 filed in the U.S. Patent and Trademark Office on Apr. 29, 1999. All of the above provisional and non-provisional patent applications are hereby incorporated by reference.

BACKGROUND OF THE INVENTION

1. Field of the Invention

This invention is related in general to the field of network control systems. More particularly, the invention is related to an Internet control system communication protocol, method and computer program.

2. Discussion of the Background

In a fully automated environment, appliances that change the various parameters of the environment can be inked to a control area network (CAN) and a controller. The appliances may include heating, ventilation and air conditioning (HVAC) systems, lighting systems, audio-visual systems, telecommunications systems, security systems, surveillance systems, and fire protection systems, for example. One or more easy-to-use user interface, such as a touch panel, may be electronically linked to the control area network to accept user input and display current system status. AMX Corporation of Dallas, Tex. designs and manufactures such networked appliance control systems.

SUMMARY OF THE INVENTION

In accordance with the present invention, a system and method of Internet control network is provided which eliminates or substantially reduces the disadvantages associated with prior control systems.

In one aspect of the invention, the boundaries between the Internet and the control area network are made transparent and the Internet becomes a device on the control area network. The Internet is controllable by user input entered on the user interface, such as touch panel. The Internet is further capable of receiving commands from the master controller in the control area network.

In another aspect of the invention, Internet applications such as web browsers and applications executing on web servers of information content providers become devices on the control area network. The Internet applications are capable of sending commands to and receiving commands from the control area network.

In yet another aspect of the present in invention, a communication protocol is provided. The communication protocol comprises a packet protocol. The packet protocol has a protocol field for indicating the type of protocol, a length of data field for listing the length in bytes of the data field, a data field containing sub protocol data, and, a checksum for determining the integrity of the packet.

In yet another aspect of the invention, a dynamic message protocol generator is provided to enable a scripting language such as VBScript or JavaScript capable of directly communicating on any TCP/IP network connection.

BRIEF DESCRIPTION OF THE DRAWINGS

For a better understanding of the present invention, reference may be made to the accompanying drawings, in which:

FIG. 4 is a more detailed block diagram of the Internet appliance server processes for coupling one or more control systems to the Internet constructed according to an embodiment of the present invention;

FIG. 5 is a more detailed block diagram of the Internet appliance server software device emulator processes for coupling one or more control systems to the Internet constructed according to an embodiment of the present invention;

DETAILED DESCRIPTION OF THE PREFERRED EMBODIMENTS

Figure 1:
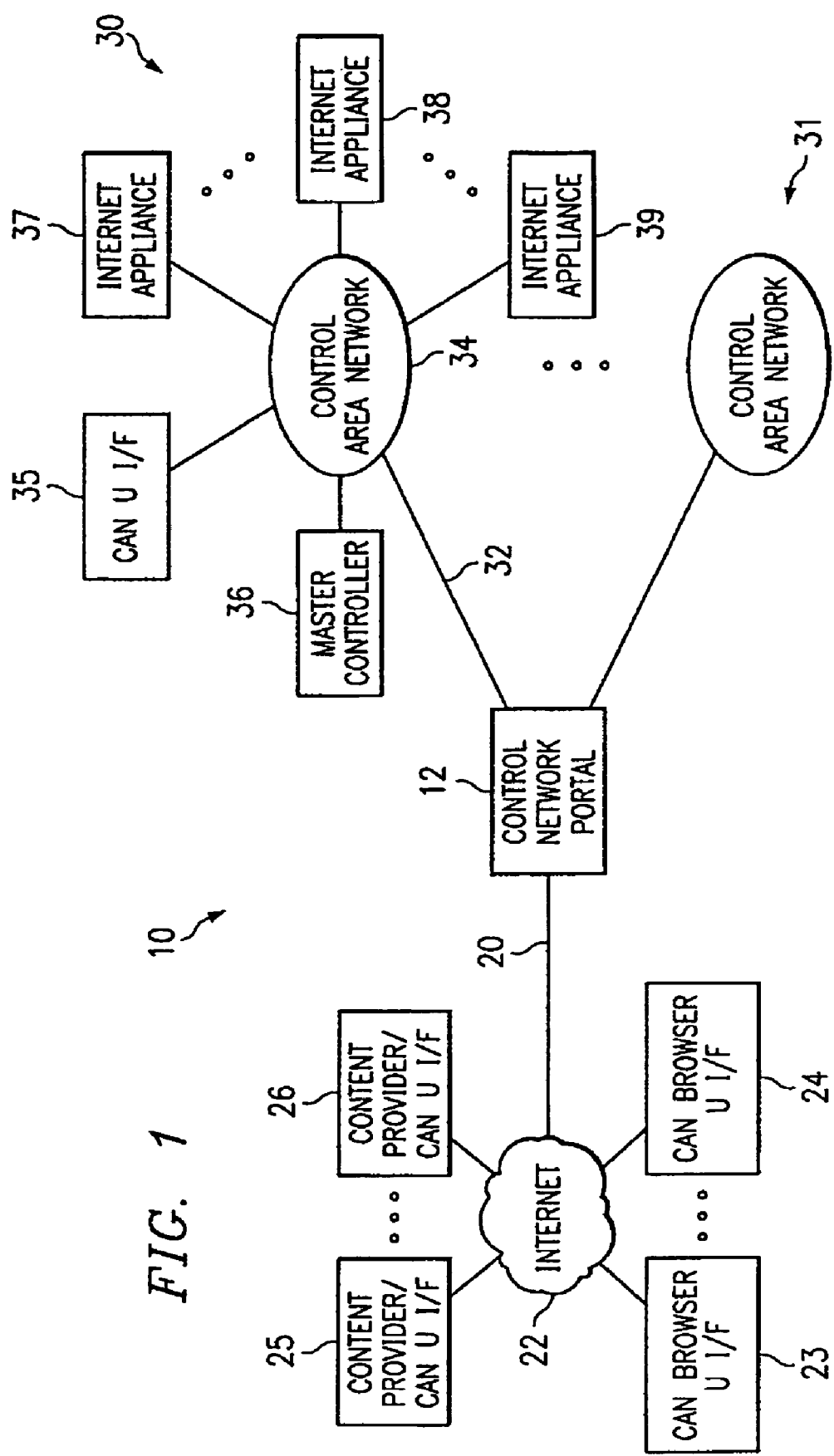
FIG. 1 is a simplified top-level block diagram of a system and method of coupling one or more control systems to the Internet constructed according to an embodiment of the present invention.

FIG. 1 is a simplified top-level block diagram of a system and method 10 of Internet control system which couple one or more control systems to the Internet constructed according to the teachings of the present invention. The implications of employing system and method 10 of the present invention are the ability to communicate with, control, and be controlled by one or more Internet nodes or Internet applications that act as one or more devices in a control system connected by a control area network (CAN). These Internet applications may include web browsers, web server applications of information content providers, and email applications. In other words, the geographical and communication protocol boundaries are transparent between a local control area network and the Internet, so that the Internet, web information content providers and web browser applications become devices in the control system. By definition, a device in the control system can send control commands to and/or receive control messages from a master controller on the control area network. Hereinafter, the word Internet may be also used to refer to an Intranet or the World Wide Web and vice versa.

System 10 includes a control network portal 12 coupled between the Internet 22 and one or more control area networks 30 and 31. Control area networks 30 and 31 are local area networks operating under transport protocols such as Ethernet, and AXLink and PhastLink of AMX Corporation (Dallas, Tex.), the assignee of the present invention, that interconnect a variety of devices, appliances and/or equipment. The underlying network connectivity 34 may be wired, wireless, power line carriers, or any suitable transmission medium. Coupled to control area networks 30 and 31 are a plurality of devices, appliances and/or equipment, including control area network user interfaces (CAN UI/F) 35, master controllers 36, and Internet appliances 37-39. Some devices may be coupled to control area networks 30 and 31 via additional intermediate communications devices, such as an RS 232 controller (not shown).

Control area network user interface device 35 is any device that is capable of receiving user input and displaying or indicating control network status. For example, a touch panel, a computer terminal with a monitor, keyboard and pointing device, and any device with similar functionalities may serve as control area network user interface 35. As described in detail below, with the use of control area network portal 12 of the present invention, Internet applications are also capable of functioning as control area network user interface devices without the use of custom and dedicated applications on the user's end.

Master controller 36 is generally a CPU-based controller that controls the communications among user interface 35 and Internet appliances 37-39. It is operable to receive user inputs received by user interface devices, such as commands, and instruct the appropriate Internet appliance to act according to the command. Master controller 36 may also poll each device in control area network 30 periodically to monitor its status. The system status and/or the status of each device may be sent to control area network user interface devices for display.

Internet appliances 37-39 are devices that can receive commands from master controller 36 and operate or act according to the command. Internet appliances 37-39 may include equipment that affect or monitor the various parameters of the premises. For example, Internet appliances 37-39 may include heating and air conditioning, lighting, video equipment, audio equipment, sprinklers, security cameras, infrared sensors, smoke detectors, etc. in a residential or commercial control area network. Household appliances, such as a hot tub, fireplace, microwave oven, coffee maker, etc. may also be Internet appliances coupled to the network. Internet appliances 37-39 may also be capable of providing a current status of its operational state to master controller 36, such as on/off, temperature settings, current ambient temperature, light intensity settings, volume settings, threshold settings, and predetermined alphanumeric strings reflective of operational states.

Master controller 36 is also operable to receive user input from nodes of the Internet 22 via control network portal 12. Connected to Internet 22 are content providers 25 and 26, which may also function as control area network user interface devices. Content providers 25 and 26 are typically web servers that generate and provide static and/or dynamic information and content in the form of web pages. Content provider applications executing on the web server are able to mine data stored in databases (not shown). The web pages are typically developed with hypertext markup language (HTML), and various other scripting languages and programming environments such as Microsoft® Active Server Pages (ASP), Common Gateway Interface (CGI), Internet Server Application Programming Interface (ISAPI), JAVA, ActiveX, Cold Fusion, etc. that make the web pages more dynamic and interactive.

Also connected to the Internet 22 are web browsers 23 and 24 that may also serve as control area network user interfaces. Web browsers 23 and 24 are application programs that can be used to request web pages from content providers 25 and 26 and decode the web pages. Web browser applications include NETSCAPE NAVIGATOR® and MICROSOFT INTERNET EXPLORER®, for example. Typically, a user executes a web browser application on her personal computer and accesses the World Wide Web via a dial-up connection to an Internet service provider. The Internet or World Wide Web may also be accessed via other means such as cable modems and digital subscriber lines (DSL). The user makes a request for a particular web page or particular web site by entering or specifying a uniform resource locator (URL). The URL is associated with an Internet protocol (IP) address of the specified web site. Every computer connected to the World Wide Web and Internet has a unique IP address. This address is used to route message packets to specific computers and users. Internet protocol or IP is the message transport and communications protocol of the Internet and World Wide Web.

When the web browser requests a certain URL, a connection is first established with a web server of a content provider that is addressed by the URL. A hypertext transport protocol (HTTP) request is then issued to the web server to download an HTML file. The web server receives the request and sends a web page file to the web browser, which decodes the file to display information in specified format on the screen. Web pages with dynamic content provided by gateway interfaces such as CGI and ISAPI are executable applications that are run by the web server upon user request. The executing gateway application is able to read parameter information associated with the request and generate an output in the form of an HTML file in response to the parameter values. Another way to add dynamic and interactive content to web pages uses ASP. ASP scripts are server-side executable scripts that are directly incorporated in the HTML web pages. Upon request for the page, the web server executes the ASP script in response to input parameter values and generates the web page with dynamic content.

Using control network portal 12, users may access control area networks 30 and 31 via web browsers 23 and 24 accessing web pages provided by control network portal 12 or value-added web pages provided by content providers 25 and 26. For example, a user who has a control area network deployed in her luxury residence to control various aspects of the home environment may use a web browser application to remotely monitor her home. She may change the temperature setting to decrease energy use, for example, because she will be leaving on a business trip straight from work. She may also use the surveillance cameras to visually ensure security has not been breached. She may even be able to remotely program her VCR to record certain favorite programs that will be broadcast while she is away.

An example of value-added web pages provided by content providers is the provision of an interactive version of the television programming web page, www.tvguide.com. A user may request this web page, determine available program choices, and click on a certain program. Options may be provided to enable the user to turn on the television and tune to a particular channel scheduled to broadcast the selected program or to program the VCR to record the selected program.

Another example of value-added web pages provided by content providers is the provision of a secured web page that an electric company may access to slightly raise the temperature settings of the air conditioning systems of its participating customers in anticipation of high demand brown out conditions. Yet another example is a web page that a security company may use to access, monitor and control the security, surveillance and fire protection systems of its customers.

Figure 2:
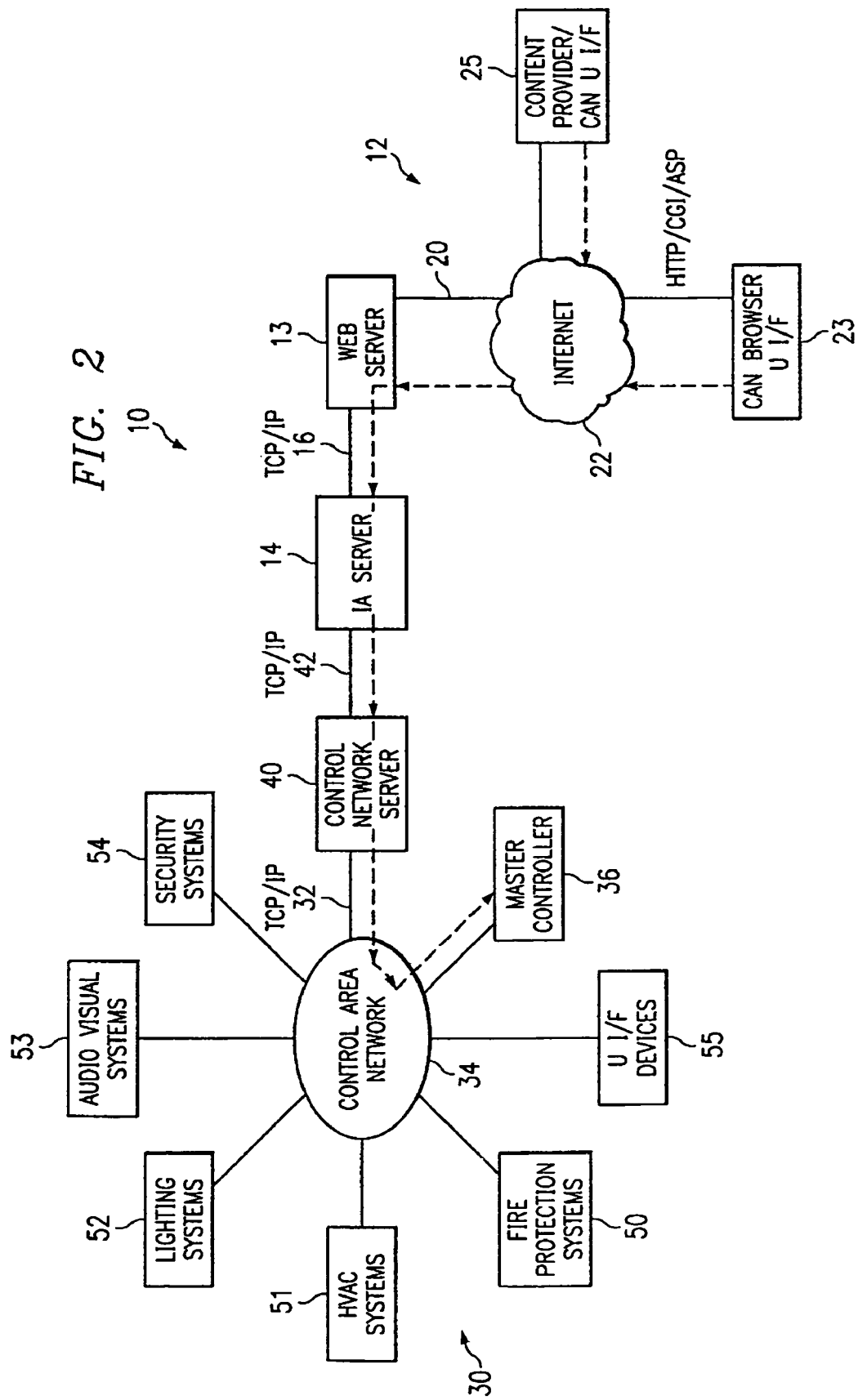
FIG. 2 is a more detailed block diagram of a system and method of coupling one or more control systems to the Internet constructed according to an embodiment of the present invention.

FIG. 2 is a more detailed block diagram of a system and method 10 of coupling one or more control system to the Internet constructed according to an embodiment of the present invention. Control area network portal 12 may include a web server 13 coupled to the Internet 22. Web server 13 is also coupled to an Internet appliance (IA) server 14, which may also be coupled to a control network server 40. Control network server 40 is coupled to control area network 30 that links several appliances and systems, such as fire protection systems 50, heating, ventilation and air conditioning (HVAC) systems 51, lighting systems 52, audio and visual systems 53, and security systems 54. Control area network 30 is also coupled to user interface devices 55 and master controller 36.

It may be noted that control network portal 12 may be implemented by a single stand-alone system that has sufficient memory and processing power or several separate systems with distinct functions as shown in FIG. 2. Web server 13 is operable to receive requests of web pages from web browser 23 and to respond by generating and providing the requested web pages. The information content of the web pages may be dynamically obtained by communicating with IA server 14, which is operable to communicate with master controller 36 via control network server 40 to obtain status and other information. Control network server 40 is used only if there is protocol conversion or other control issues needed to operate the control area network. It may be thought of, logically, that IA server 14 is directly coupled to the network and functions as a device on the network. Commands entered at a web browser are sent to web server 13, which relays the commands to master controller 36 via IA server 14 and control network server 40. Master controller 36 then instructs appropriate appliances and/or systems in the control network to act according to the received command.

Figure 3:
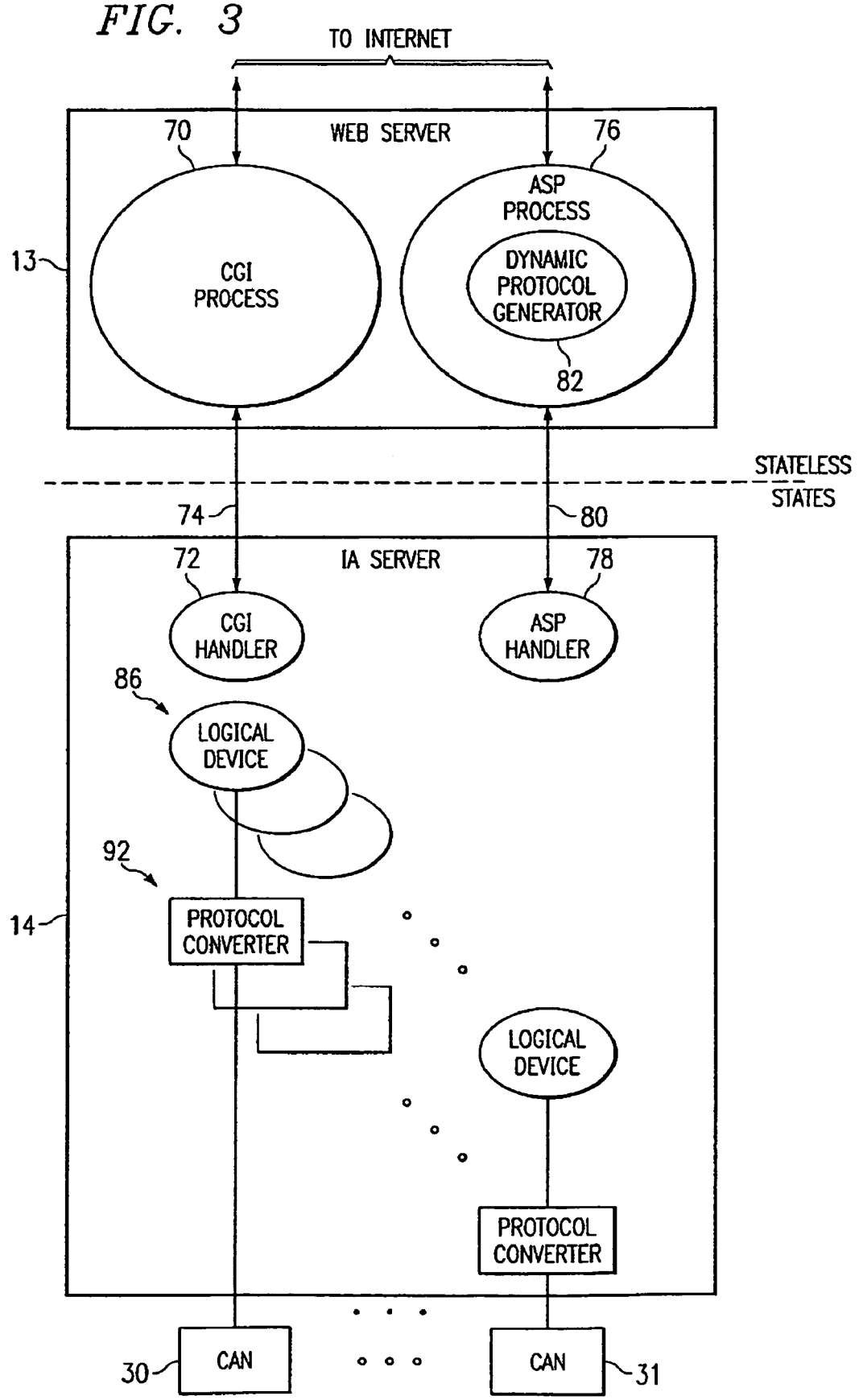
FIG. 3 is a more detailed block diagram of the processes and communications between a web server and an Internet appliance server for coupling one or more control systems to the Internet constructed according to an embodiment of the present invention.

FIG. 3 is a more detailed block diagram of the processes and communications between a web server 13 and an Internet appliance server 14 for coupling one or more control systems to the Internet constructed according to an embodiment of the present invention. Web server 13 may include one or more CGI processes 70 for responding to CGI requests from the Internet and one or more ASP processes 76 for responding to ASP requests form the Internet. It is contemplated by the present invention that other processes able to handle other extensions to HTML or other types of requests may also be provided. It is also contemplated by the present invention that web server 13 may merely pass through the received IP message if extension processing is not required. Further, a special protocol process, such as an Internet control system protocol (ICSP) process, which takes the IP message from the Internet and forms a message of the type and protocol understood by IA server 14. The ICSP protocol is designed by AMX Corporation. The CGI, ASP and other processes may be dynamically spawned when there is a request of the corresponding type received by web server 13. ASP process 76 may include a dynamic protocol generator 82, which enables web pages provided by web server 13 to generate, send and receive TCP/IP messages to IA server 14 and the Internet. In other words, dynamic protocol generator 82 enables a scripting language such as VBScript or JavaScript to be capable of directly communicating on any TCP/IP network connection. Details of dynamic protocol generator 82 are described below.

IA server 14 includes a CGI handler 72, which communicates with CGI process 70, and an ASP handler 78, which communicates with ASP process 76. Handlers 72 and 78 are operable to provide a translation function from IP to a protocol used in the control area networks, such as PhastLink or AXLink in AMX Corporation control area networks. IA server 14 is operable to spawn a software logical or virtual device that is representative of or associated with a physical device directly connected to a control area network or a content provider coupled to the Internet. Multiple software logical devices may be connected to a single control area network or content provider, if needed. Devices, whether physical or logical, are assigned a system identifier (system ID) and a unique device identification number (device ID) used to indicate the destination or origination of messages. One or more protocol converters 92 may be provided to translate from the protocol used internally in IA server, such as ICSP, to other protocols used in the control area networks, such as AxLink or PhastLink. A protocol converter is not necessary if the protocols employed in IA server 14 and a control area network 30 are the same.

FIG. 4 is a more detailed block diagram of the Internet appliance server processes for coupling one or more control systems to the Internet constructed according to an embodiment of the present invention. Coupled to CGI handler 72 and ASP handler 78 is a software device emulator 90 that is operable to spawn one or more software logical devices 86, which are software representations of devices connected to the control area networks or content providers connected to the Internet. Software device emulator 90 communicates with a protocol converter layer 92 which provides a protocol translation function between the IA server protocol and the control area network protocol, if they are different. A CAN transport protocol client 94 is also provided to communicate with the control area network coupled to IA server 14.

By the use of software logical devices, Internet applications such as web content providers appear to IA server 14 no different than devices connected to a control area network. Therefore, it appears that Internet applications like content providers on the web are able to directly communicate with the master controllers of the control area networks to issue commands to devices in the control area networks. Similarly, Internet applications appear to be devices on the control area network that can be controlled by the master controller. The master controller is able to issue commands to the Internet applications.

FIG. 5 is a more detailed block diagram of the Internet appliance server software device emulator processes 90 for coupling one or more control systems to the Internet constructed according to an embodiment of the present invention. Emulator 90 includes an Internet control system protocol (ICSP) software device core 100. Software device core 100 communicates with the web server via a device application program interface (API) 110. Software device core 100 also communicates with the control area networks via control area network I/O queues 112. Emulator 90 also includes a CAN input message processor 102, a device state maintenance process 104 and a device state storage process 106. CAN input message processor 102 is operable to receive input messages and parse the fields of the message to determine a message destination. The message destination specifies a software logical device to receive the message. Recall that software logical device may represent a device on a control area network or an Internet application on the Internet. Device state maintenance process 104 is operable to determine a current state of a software logical device and to determine a next state in response to the processed message. Device state storage 106 is operable to store state transition logic of each software logical device for use by device state maintenance process 104.

Figure 6:
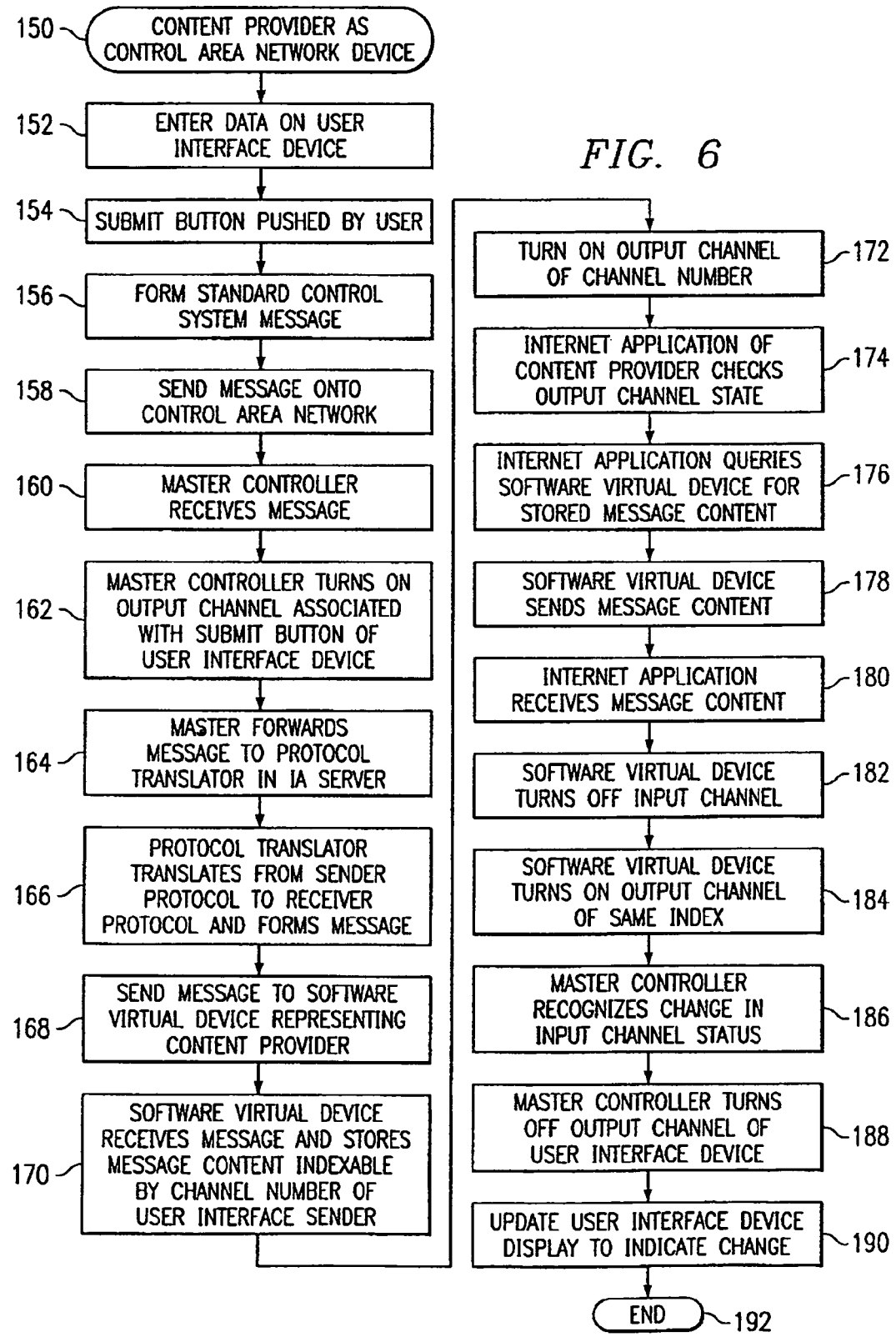
FIG. 6 is a flowchart of a process in which a content provider is a control area network device according to an embodiment of the present invention.

Referring to FIG. 6, which shows a flowchart of an embodiment of a process 150 in which a command entered at a CAN user interface is delivered to a content provider on the Internet according to the present invention. A user enters data on a user interface device coupled to a control area network, as shown in block 152. The user interface device may be a touch panel or a computer terminal with a monitor, keyboard and mouse, for example. The user may enter an alphanumeric string, click on a button icon on the screen, push a button on the touch panel, or effect any other suitable input. The data entry may require the user to also submit the entered data, such as pushing a Submit or Enter button, as shown in block 154. The user interface device then forms a control system message incorporating the entered data and the sender and recipient of the message, as shown in block 156. The master controller then sends the message onto the control area network, as shown in block 158. The sender and recipient are specified by a unique combination of system ID and device ID. The recipient may be determined by the data entered by the user. For example, the user may have pushed a button associated with updating the web page of the content provider. The content provider is previously assigned a unique combination of system ID and a device ID.

The master controller on that network receives the message and processes the message, as shown in block 160. An output channel state associated with the submit button of the user interface device is turned ON by the master controller to indicate that the data is being sent. The ON state of the output channel of the submit button is conveyed to the user interface, which may highlight the submit button or display a predetermined character string as a means of feedback to the user. In block 164, the master controller then forwards the message to the protocol converter associated with the recipient software logical device in the IA server. The protocol converter then translates the message from the sender protocol to the recipient protocol, as shown in block 166. Note that protocol conversion is not necessary or is null if the sender protocol is the same as the recipient protocol.

In block 168, the translated message is then sent or otherwise conveyed to the software logical device that represents the recipient convent provider. The recipient software logical device receives the message and stores the message content in a data structure at a specific location specified by an index value, such as a number, which corresponds to the channel number of the recipient software logical device, as shown in block 170. The stored message is accessible by specifying the index number. The software logical device then changes the state of an output channel of the same channel number to ON, as shown in block 172. It may be noted that each device, whether physical or logical, may have one or more channels, each indicative of a specific function, parameter or property. Further, each channel may have an input and an output channel state.

Periodically or at its discretion, the recipient Internet application checks the output channel states of the software logical device associated therewith, as shown in block 174. The Internet application recognizes that an output channel state is ON and therefore the data associated with that channel has been changed. In block 176, the Internet application queries the software logical device for the data by specifying the index value. In response, the software logical device sends the message to the Internet application, as shown in block 178. The Internet application receives the message and uses and acts according to the data in an appropriate manner. The software logical device turns OFF the input channel state, as shown in block 182, and turns ON the output channel state of the same index value, as shown in block 184.

The master controller recognizes a change in the input channel state of the software logical device representing the Internet application, as shown in block 186. In response, the master controller turns OFF the output channel of the user interface device, which is used to notify the user that the requested action has been completed, as shown in block 188. A change in the color or shade of the displayed button or the display of a predetermined string may be used to inform the user, as shown in block 190. The process ends in block 192.

Figure 7:
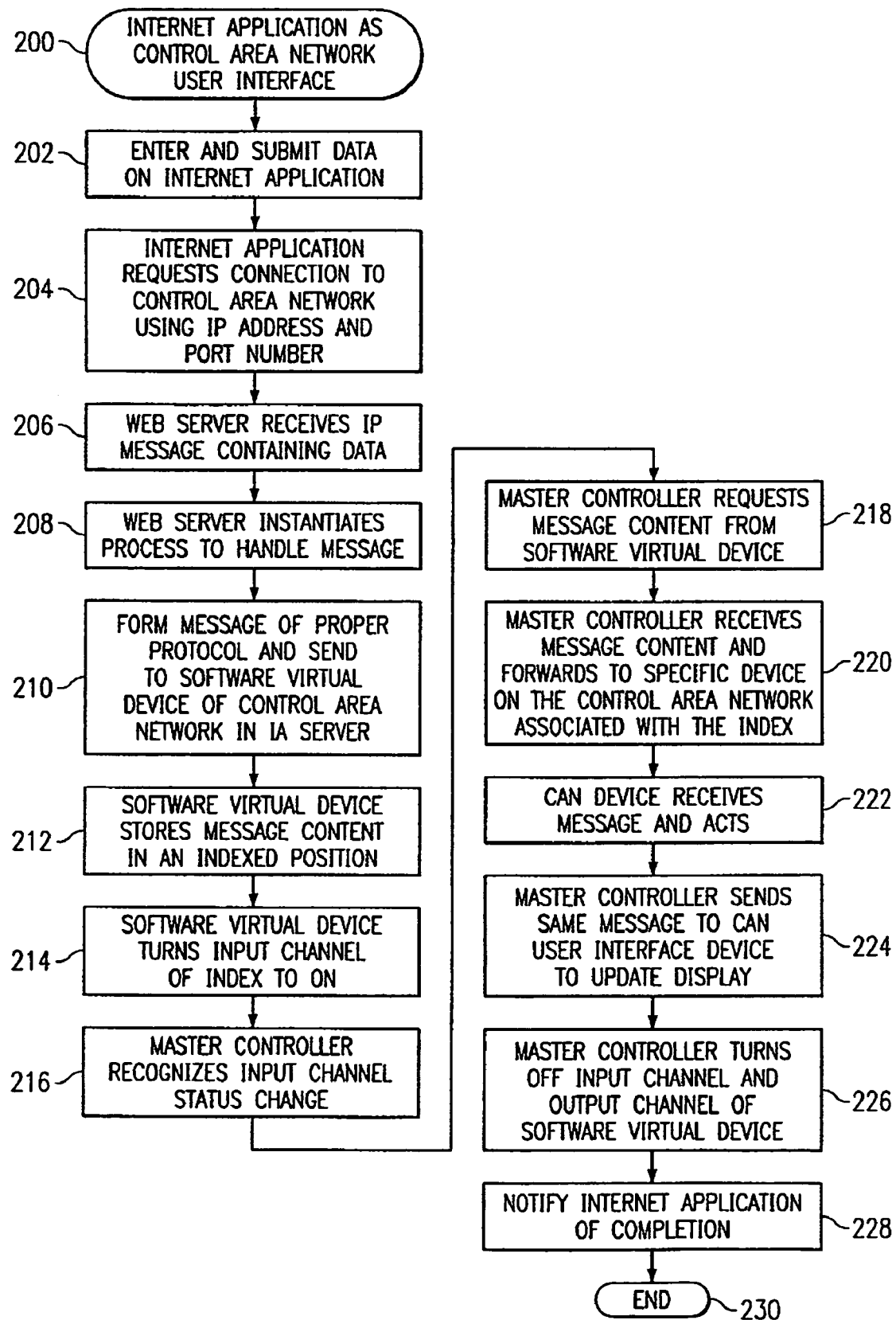
FIG. 7 is a flowchart of a process in which an Internet application is a control area network user interface according to an embodiment of the present invention.

FIG. 7 is a flowchart of an embodiment of a process 200 in which an Internet application functions as a user interface in the control system according to the teachings of the present invention. In block 202, a user enters and submits data on an Internet application. The Internet application may be an application executing on a web server of a web content provider, a web browser, or any other suitable Internet-based application program. The Internet application may be operable to receive an alphanumeric string entered by the user, the activation of a displayed image or icon, or a combination of keystrokes entered by the user. The Internet application then requests connection to the control system by specifying an IP address and port number of the recipient software logical device, as shown in block 204. The web server is connected with the Internet application and receives the IP message containing the entered data, as shown in block 206. The web server then instantiates one or more processes to handle the received message, as shown in block 208. For example, a CGI process may be provided to handle CGI scripts or an ASP process may be provided to handle ASP scripts. In the case of a web browser connecting to the web server, the instantiated process extracts data from the IP message received from the Internet application and forms a message of a protocol used by IA server 14, such as ICSP. In the case of a content provider connecting to the web server, the message is preferably already in the form of a ICSP message transported by IP, which does not require protocol conversion. The spawned process then sends the ICSP message to the software logical device associated with the recipient device in the control system, as shown in block 210. The recipient is identified by a system ID and a device ID.

The software logical device then stores the message content in an indexed position in a data structure, as shown in block 212. The software logical device turns ON the input channel associated with the index number, as shown in block 214. The master controller becomes aware of the input channel state change by periodically polling the channel states, as shown in block 216. The master controller may alternatively be triggered to query the channel states by some mechanism other than time. The master controller then requests the message content at the specified index number be sent to it, as shown in block 218. The software logical device then sends the message content to the master controller, which forwards the message content to the physical device in the control system, as shown in block 220. The device receives the data and acts accordingly, as shown in block 222. The master controller may also send the same data to a user interface in the control area network to update the display, as shown in block 224. The software logical device then turns OFF the input and output channels, as shown in block 226. The OFF states of the input and output channels notifies the Internet application, which may periodically poll the software logical device to determine the input and output channel states, that appropriate action has been taken in response to the entered data, as shown in block 228. The process ends in block 230.

It may be noted that the use of input and output channel states to notify the recipient that data is available and the sender that an action has been completed is merely provided herein as an example. Other means may be used for this function.

Figure 8:
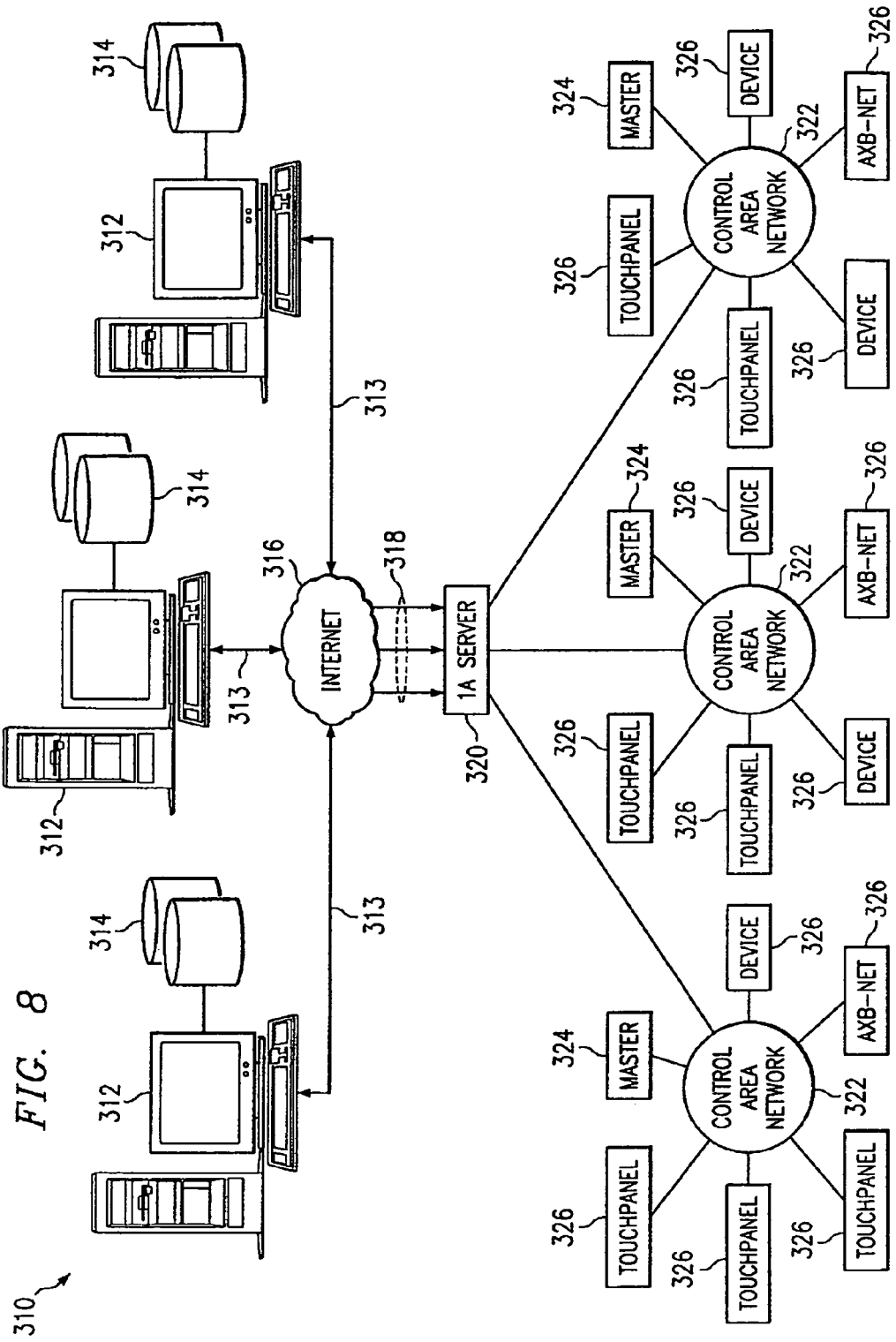
FIG. 8 illustrates a block diagram of a control system in accordance with the teachings of the present invention.

FIG. 8 illustrates a block diagram of a control system 310 in accordance with the teachings of the present invention. FIG. 8 shows an Internet web servers 312 coupled to a plurality of databases 314. Web servers 312 are coupled to the Internet 316 via communication lines 313. While the Internet is used as a network, the web servers could be connected to any systems or wide array networks, local area networks or Intranets. Communication lines 313 can be any direct or wireless connection.

Internet 316 is coupled to an Internet appliance server 320. Internet appliance server 320 is coupled to a plurality of control area networks 322. Each control area network has one master 324 and a variety of control area network devices 326 which can include touch panels, audio/visual equipment, and the like. Control area network devices 326 are equivalent to the Internet appliances described previously.

Web servers 312 are computers having a processor, such as an INTEL or Motorola processor, and memory. Web server 312 runs a web server program operable to provide web pages to a requesting user, the requesting user typically using a web browser.

Databases 314 are operable to store information that can be used by web servers 312 to provide content that may be required by a control area network device 326. This can include information such as CD lists, television listings, sports data, stock information or any other type of information that may be used by control access network device 326.

Internet 316 is the collection of networks located across the world interconnected for user and computer communication, including the part of the Internet known as the World Wide Web. While system 310 shows web server 312 connected to the Internet 312, web servers 16 can be connected to any system of wide area networks, local area networks or Intranets.

Internet appliance server 320 is a device operable to act as a gateway between devices connected to the Internet 316 and control area network 322. Internet appliance server 320 is, in one embodiment operable to translate messages generated by web server 317 to messages useable by control area network devices 326.

In system 310, devices 326 communicate with other devices on the same control area network 322 or different control area networks 322. Devices 326 also receive messages generated outside the control area network 322 or generated by the master 324. All message sent by device 326 is routed through the master 324 on the control area network 322.

Figure 9:
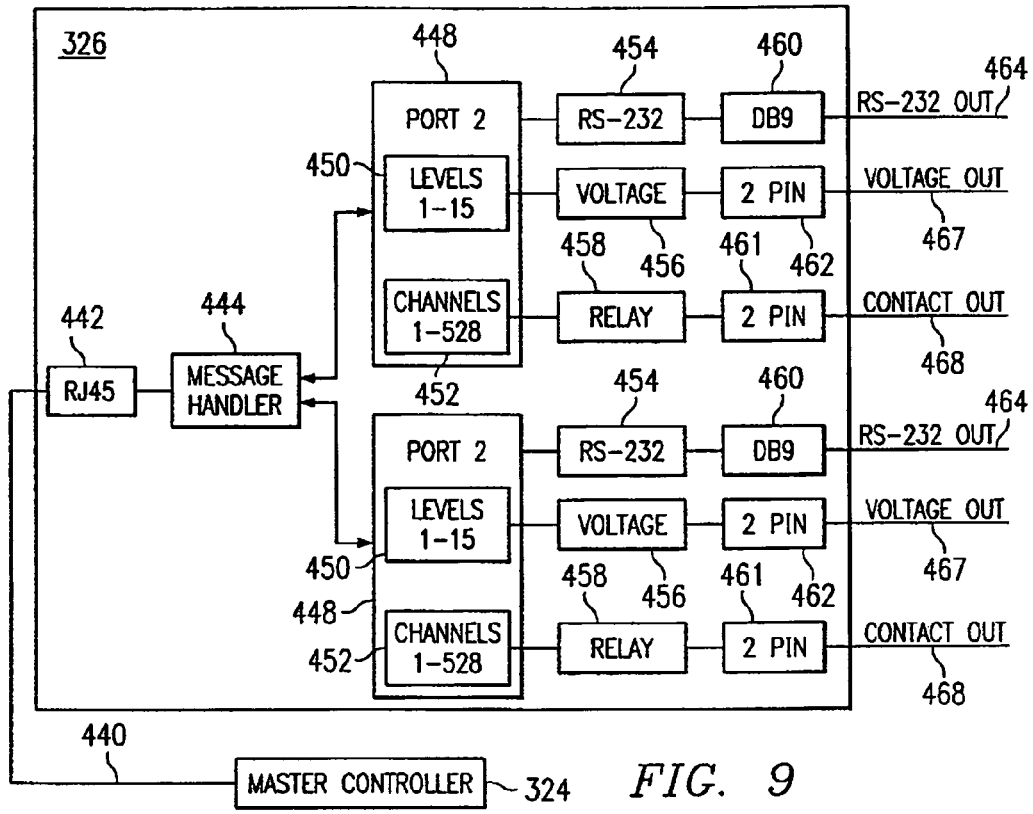
FIG. 9 is a block diagram of a control area network device in accordance with the teachings of the present invention.

FIG. 9 is a block diagram providing an exemplary control area network device 326 in accordance with the teachings of the present invention. Device 326 comprises the communication line 440 coupled to a communication jack 442, which, in one embodiment is an RJ45 jack. A message handler 444 is coupled to communication jack 442. Message handler 444 is further coupled to one or more ports 448. Each port 448 comprises one or more levels 450 and channels 452. Each port 448 may be connected to an RS-232 connection 454 which in turn connects to a nine-pin connector 460 and a RS-232 IO interface 464, for example. Each level 450 is connected to a voltage regulator 456 which in turn connects to a two-pin interface 462 and provides a voltage out 467. Each channel 452 is connected to a relay 458 which in turn connects to a two-pin connector 461 and provides a contact out 468.

In operation, messages in the first protocol, such as Phastlink+, PL+ or ICSP developed by AMX Corporation are received by a communication line 440 from a source such as a master controller 324. Message handler 444 receives the messages. Message handler 444 is responsible for receiving the message and sending the message to the appropriate port 448.

Port 448 is a control output or input on the device that is discreetly addressable. An example of a port could be an infrared generator device. There can be multiple ports in a device. Each port 448 would be numbered separately. Ports 448 can communicate with the outside world through an RS-232 interface 464, different interfaces or no interface at all.

As part of a port 448, channels 452 are provided. A channel is a part of port 448 and can take on a binary value of either on or off. In one embodiment, each port 448 can have up to 65,535 channels 452. Channels 452 are typically connected to relays 58 which can be in an on or off condition. Relay 458 is connected to a contact out 468, which allows on or off control of whatever port 448 is connected to. Channels 448 are bi-directional and can be input channels, output channels, or input/output channels.

Levels 450 are in some ways similar to channels. The main difference is that levels can take on any number of values instead of just a binary 0 or 1. Typical uses for levels include setting volume level, setting light level, etc.

Thus, the purpose of message in this protocol is to send and receive controls for devices, which are attached to control area network as well as send and receive status and routing information. For example, for the device shown above, a message could be sent to device 326, which would turn on a television, set a volume level for the television, and then perhaps scroll some information across television screen. This could be accomplished by a message sent to device 326 and interpreted by message handler 444. The message may have a command to turn the television set on and that would be sent to the channel, which would then control the relay to turn the television on. To set the volume level, the message command to set the level at a certain value is received at message handler 444. The command goes to level 450 and then to the voltage regulator 456 which in turn would then set the level by two-pin connector 462. The scrolling message might then go through the port 448 through the RS-232 port and displayed on the television connected to serial port DB-9 460.

A device can be a user interface or a controlling device, or both. User interfaces are things such as touch panels, one way wireless handheld transmitter, or custom panels. The controlling device provides the control methods for a device. For example, IR generators are controlling devices that can control a VCR, television, or other item. Each device in the system has its own unique device number, as well as port numbers and channels and levels that could be accessed.

Figure 10:
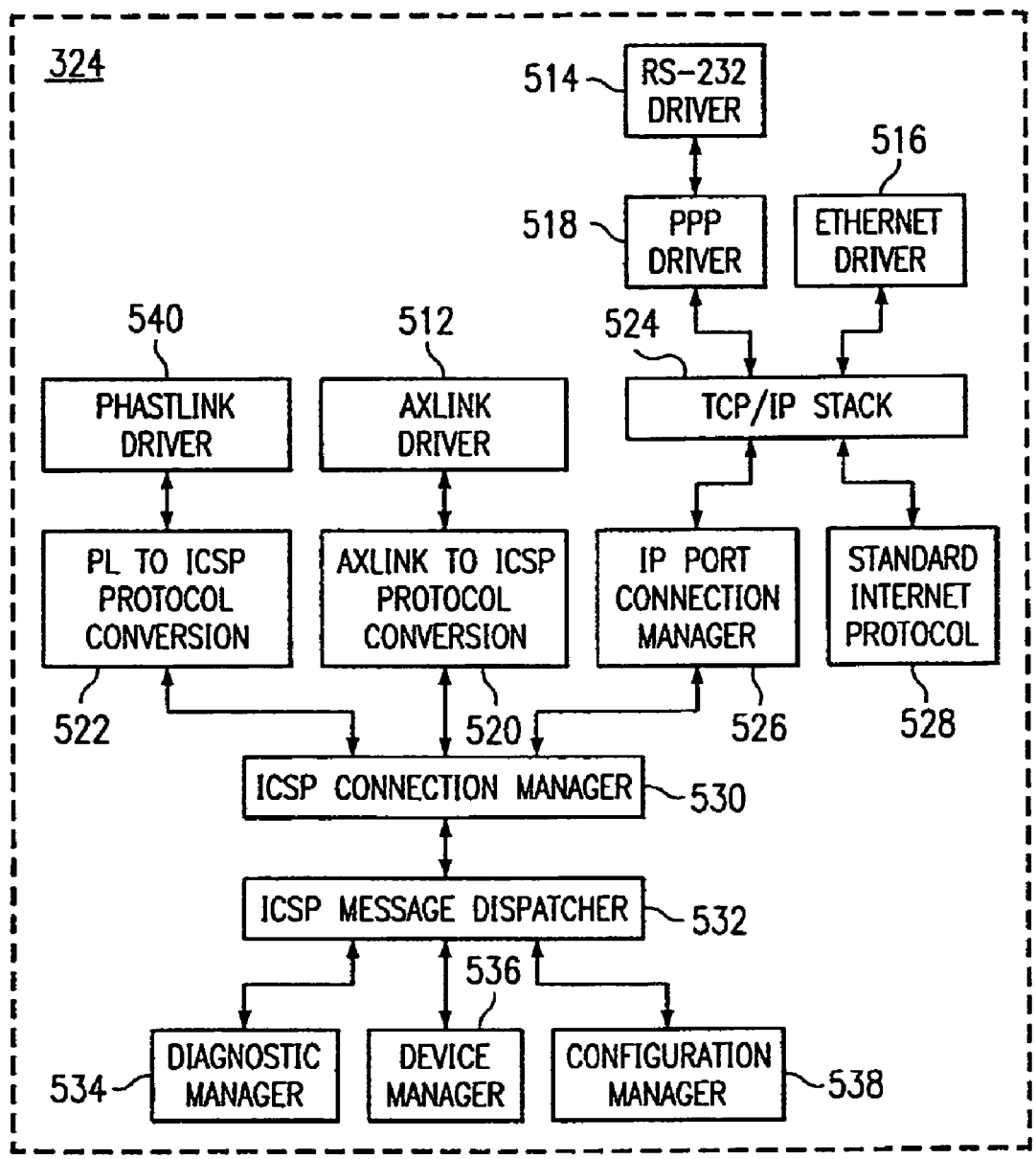
FIG. 10 is a block diagram of routing components of a control area network master.

FIG. 10 illustrates a block diagram of routing components of a master controller 324. These components comprise a connection manager 530, which provides connections between higher level managers and lower level drivers. ICSP connection manager 530 is coupled to a phastlink driver 510 via a PL to ICSP protocol conversion 522. An AXlink driver 512 is coupled to ICSP connection manager 530 via an AXlink to ICSP protocol conversion 520. Phastlink and Axlink are exemplary protocols used on control access networks.

Additionally, an RS-232 driver 514 is coupled to ICSP connection manager 530 via a PPP driver 518 coupled to a TCP/IP stack 524 and an IP port connection manager 526. ICSP connection manager 530 is coupled to ethernet driver 516 via TCP/IP stack 524 and IP port connection manager 526. RS-232 driver 514 provides connectivity to RS-232 devices and Ethernet driver 516 provides connectivity to devices attached to an Ethernet connection.

ICSP connection manager 530 is coupled to ICSP message dispatcher 532. ICSP message dispatcher 532 can send messages to different managers including a diagnostic manager 534, a device manager 536 or a configuration manager 538.

PL to ICSP protocol conversion 522 converts from phastlink (PL) to ICSP and vice versa. In some embodiments PL to ICSP protocol conversion 522 is operable to de-multiplex incoming multiple messages into multiple messages destined for ICSP connection managers and multiple outgoing messages into a single packet for PL devices. AXlink to ICSP protocol conversion 520 converts messages between devices that use the AXlink protocol to ICSP protocol and vice versa.

ICSP connection manager 530 is operable to provide routing functionality. ICSP connection manager can route to local masters, local devices, remote masters and remote devices. Routing is accomplished by first routing a message to the appropriate system master and then to the correct device. The destination will be contained in the header of the packet as discussed below.

IP port connection manager 526 is operable to manage all IP connections, except standard Internet protocols. Standard Internet protocol 528 provides for standard protocols such as HTTP, FTP, SMNP and SMTP.

ICSP message dispatcher 532 determines the category of the message, such as diagnostic message, device specific messages and configuration messages and routes them to their specific message managers. These include the diagnostic manager 534, the device manager 536, and the configuration manager 538 and any other managers.

Figures 11, 13:
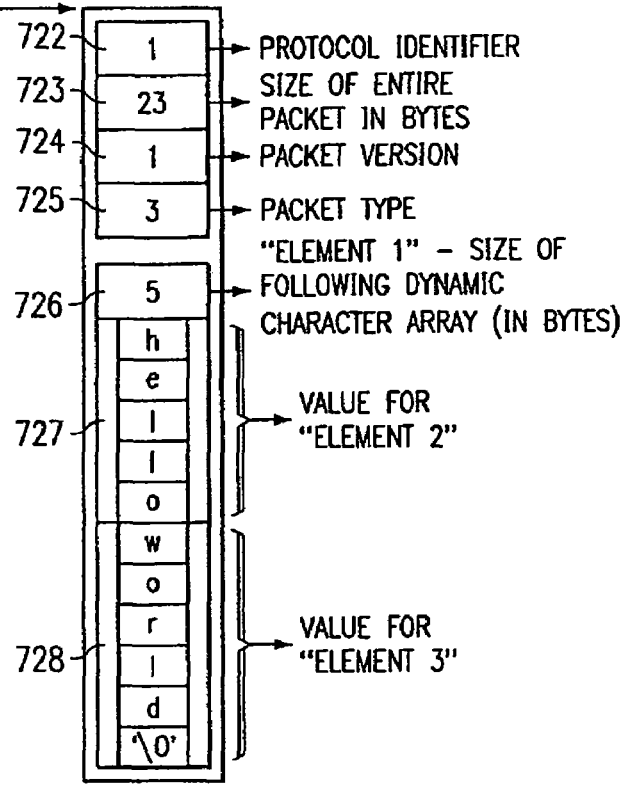
FIG. 11 is an exemplary packet for messages in accordance to teaching the present invention.
FIG. 13 is an exemplary message structure in accordance to teaching the present invention.

FIG. 11 is a diagram of an exemplary packet for messages in accordance to teaching the present invention. The first field is a protocol field 670, and in one embodiment, one byte size. Protocol field identifies the format of the data section of the packet with some protocol. Length of data field 672 indicates the total number of bytes in the data portion of the packet. Flag field 674 can be one of two types of flags. One is a broadcast flag. The broadcast flag will send a broadcast message to all devices on a network. A newbie flag is placed in flag field 674 when a device is added to the network. This will then cause a response from the master indicating that it received the message from the newbie device.

Destination system field 676 allows for the addressing of the message to reach a specific system. A system is, in one embodiment, a complete control area network with a single master. Thus, message can be directed to one of many different control area networks. In one embodiment control system field is two bytes in size. Destination device field 678 lists the number the device that the message is being sent. The device range can be anywhere between 0 and 65,535. Destination port field 680 lists the specific port of the device that the message is destined for. In one embodiment the protocol supports up to 65,535 ports on the device.

Source system field 682 is the number of a system where the message originates. Source device field 684 lists the device that the message originated from. If the device number is 0, this indicates that the master of that control area network is the enunciator of the communication. Source port field 686 lists the port where the message originated.

An important aspect of addressing is the sequencing of messages. There are certain messages and circumstances under which messages must be delivered in the order intended. This requires that each device be guaranteed the correct order for delivery. However, while messages destined for a certain device must be delivered in the order intended, out of order messages are possible when destined for different devices.

Allowed hop count field 688 indicates how many hops can occur before the message is purged from the system. Each time a message passes through a master, the allowed hop count field is decremented by one and checked to see if it reaches zero. Once the count reaches zero, the master generates an error message indicating that the message has not reached the sender with an air. Message I.D. field 690 contains the unique identification number for a message. This message I.D. is used by low level communication algorithms to correlate in the original message with its acknowledge and response.

Message command field 692 and message data 694 represent the actual message being sent in the packet. Each packet is decoded by reading the message field 692 and performing the appropriate functions. Some commands are designed for communication between a device manager located in the master and other ones are intended for communication with the connection manager located in the master. TABLE A below lists exemplary messages that are valid between a device manager and the device or master. First column lists the command, the second column lists the value of the command, the third column lists the valid response from the device for that command, and the fourth column lists the valid response for the master of that command and the fifth column lists the description of the command. For example, command input channel OFF status is sent from a device to a master, which sends the input channel off status to the master. The value of the command sent in the command value of the command field 692 is 0x0085. Because the device is sending the message there is no response for the device. The master response is 0x0001, which is the command for acknowledge and the description of the command indicates that the input channel is in the off status. Thus, this command would be sent by a device after being queried by the master to say that its input channel is in the off status, or it can be sent unsolicited. The master would then send back an acknowledgment.

TABLE A

| Command | Value | Valid Response Messages From | | Description |
| | | DEVICE | MASTER | |
| --- | --- | --- | --- | --- |
| Acknowledge | 0x0001 | None | None | Confirmation of message receipt. |
| Nak | 0x0002 | None | None | Indicates failed delivery of a message. |

TABLE A-continued

| Command | Value | Valid Response Messages From DEVICE | Valid Response Messages From MASTER | Description |
|---|---|---|---|---|
| Input Channel ON Status (PUSH) (Device->Master) | 0x0084 | Error | 0x0001 | Input channel turned ON status message (PUSH). |
| Input Channel OFF Status (RELEASE) (Device->Master) | 0x0085 | Error | 0x0001 | Input channel turned OFF status message (RELEASE). |
| Output Channel ON (Master->Device) | 0x0006 | 0x0086, 0x0088, or 0x0001 | 0x0086 | Output turn ON message. If device does not support channels, then message is only ACKed. |
| Output Channel ON Status (Device->Master) | 0x0086 | Error | 0x0001 | Output turned ON status message. |
| Output Channel OFF (Master->Device) | 0x0007 | 0x0087, 0x0089, or 0x0001 | 0x0087 | Output turn OFF message. If device does not support channels, then message is only ACKed. |
| Output Channel OFF Status (Device->Master) | 0x0087 | Error | 0x0001 | Output turned OFF status message. |
| Input/Output Channel ON Status (Device->Master) | 0x0088 | Error | 0x0001 | Input and Output channel turned ON message. |
| Input/Output Channel OFF Status (Device->Master) | 0x0089 | Error | 0x0001 | Input and Output channel turned OFF status message. |
| Feedback Channel ON | 0x0018 | N/A | N/A | Indicates the feedback state the master is maintaining. Only generated for Diagnostic purposes. |
| Feedback Channel OFF | 0x0019 | N/A | N/A | Indicates the feedback state the master is maintaining. Only generated for Diagnostic purposes. |
| Level Value (Master->Device) | 0x000A | 0x008A or 0x0001 | 0x008A | A level value changed. If device does not support levels, then message is only ACKed. |
| Level Value (Device->Master) | 0x008A | Error | 0x0001 | A level value changed. |
| String (Master->Device) | 0x000B | 0x0001 | 0x0001 | Used to transfer a "String". |
| String (Master->Device) | 0x008B | Error | 0x0001 | Used to transfer a "String". |
| Command (Master->Device) | 0x000C | 0x0001 | 0x0001 | Used to transfer a "Command". |
| Command (Device->Master) | 0x008C | Error | 0x0001 | Used to transfer a "Command". |
| Request Level Value (Master->Master) | 0x000E | Error | 0x008A or 0x0001 | Requests the status of specified level value. If the level does not exist, the response message is ACK. |
| Request Output Channel Status (Master->Master) | 0x000F | Error | 0x0086, 0x0087, or 0x0001 | Requests the status of specified Output channel or ALL Output channels that are ON (if channel = 0). If the request is for all channels and none are on then response is ACK. |
| Request Port Count (Master->Master) | 0x0010 | Error | 0x0090 | Request number of ports used by device. Assumed 1 if no response. |
| Port Count by (Device->Master) (Master->Master) | 0x0090 | Error | 0x0001 | Number of ports used device. Sent upon reporting by a device if it has more than one Port. Sent by a master as a response to Request Port Count. |

TABLE A-continued

| Command | Value | Valid Response Messages From DEVICE | Valid Response Messages From MASTER | Description |
|---|---|---|---|---|
| Request Output Channel Count (Master->Master) | 0x0011 | Error | 0x0091 | Request number of output channels used by specified port on device. Assumes 256/port if no response. |
| Output Channel Count (Device->Master) (Master->Master) | 0x0091 | Error | 0x0001 | Number of channels used by specified port. Sent upon reporting by a device/port if it has more than 256 channels. Sent by a master as a response to Request Output Channel Count. |
| Request Level Count (Master->Master) | 0x0012 | Error | 0x0092 | Request number of levels used by specified port. Assumes 8/port if no response. |
| Level Count (Device->Master) (Master->Master) | 0x0092 | Error | 0x0001 | Number of levels used by specified port. Sent upon reporting by a device/port if it has more than 8 levels. Sent by a master as a response to Request Level Count. |
| Request String Size (Master->Master) | 0x0013 | Error | 0x0093 | Request number of bytes supported by device/port for a single SEND_STRING. Assume 64 bytes if no response. |
| String Size (Device->Master) (Master->Master) | 0x0093 | Error | 0x0001 | Number of bytes/string supported by device. Sent upon reporting by a device/port if it supports than 64 byte strings. Sent by a master as a response to Request String Size. |
| Request Command Size (Master->Master) | 0x0014 | Error | 0x0094 | Request number of bytes supported by device/port for a single SEND_COMMAND. Assume 64 bytes if no response. |
| Command Size (Device->Master) (Master->Master) | 0x0094 | Error | 0x0001 | Number of bytes/command supported by device. Sent upon reporting by a device/port if it supports than 64 byte commands. Sent by a master as a response to Request Command Size. |
| Request Level Size (Master->Master) | 0x0015 | Error | 0x0095 | Requests the datatypes supported by a level. Assume BYTE (Type 0x10) if no response. |
| Level Size (Device->Master) (Master->Master) | 0x0095 | Error | 0x0001 | Highest data type supported for a level. Sent upon reporting by a device if it supports more than BYTE (Type 0x10) data types. Sent by a master as a response to Request Level Size. |
| Request Status (Master->Master) | 0x0016 | Error | 0x0096 | Request status of the device and or Port. |
| Status (Device->Master) (Master->Master) | 0x0096 | Error | 0x0001 | Sent by device to update master of Status. Sent by master as a response to Request Status. |

TABLE A-continued

| | | Valid Response Messages From | | |
|---|---|---|---|---|
| Command | Value | DEVICE | MASTER | Description |
| Request Device Info (Master->Device) | 0x0017 | 0x0097 | 0x0097 | Type of device, version, etc including sub-devices. |
| Device Info (Device->Master) | 0x0097 | Error | 0x0001 | Response to above. |
| Device Info EOT (Master->Device) | 0x0098 | None | None | Indicates that all previously requested Device Info has been transferred. |
| Request Master Status (Device->Master) (Master->Master) | 0x00A1 | Error | 0x0021 | Request the status of a system master. |
| Master Status (Master->Device) (Master->Master) | 0x0021 | 0x0001 | 0x0001 | Master status. Used to indicate various states of a Master. |

The "Value" field from TABLE A is placed in the "MC" (MessageCommand) field of the packet. Any Message Data required is placed in the variable length "MD" (MessageData) field.

The following is a more detailed description of exemplary commands.

Acknowledge

This message is generated by the master or device to confirm receipt of a message sent. The MessageID field must match the original message's MessageID and the Response bit should be set.

Message and Parameters:

| Field | Value(s) | Description |
|---|---|---|
| MC | 0x0001 | Acknowledge Value |
| MD | <None> | Nothing |

Nak

This message is generated by the master when the destination system/device for the message does not exist. This message indicates that a previous message was not routable by the master. The MessageID field must match the original message's MessageID and the Response bit should be set.

Message and Parameters:

| Field | Value(s) | Description |
|---|---|---|
| MC | 0x0002 | Nak Value |
| MD | <None> | Nothing |

Input Channel ON Status (Device->Master)

The Input Channel ON message is generated when a button is PUSHed or Input channel is turned ON from a device/port or a master.

Message and Parameters:

| Field | Value(s) | Description |
|---|---|---|
| MC | 0x0084 | Input Channel ON Value |
| MD[1 . . . 2] | Device | Unsigned 16-bit value. |

-continued

| Field | Value(s) | Description |
|---|---|---|
| MD[3 . . . 4] | Port | Unsigned 16-bit value. |
| MD[5 . . . 6] | System | Unsigned 16-bit value. |
| MD[7 . . . 8] | Channel | Unsigned 16-bit value. |

Input Channel OFF Status (Device->Master)

The Input Channel OFF message is generated when a button is RELEASEd or Input channel is turned OFF from a device/port or a master.

Message and Parameters:

| Field | Value(s) | Description |
|---|---|---|
| MC | 0x0085 | Input Channel OFF Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Channel | Unsigned 16-bit value. |

Output Channel ON (Master->Device)

The Output Channel ON message is generated when an Output channel is turned ON from a master.

Message and Parameters:

| Field | Value(s) | Description |
|---|---|---|
| MC | 0x0006 | Output Channel ON Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Channel | Unsigned 16-bit value. |

Output Channel ON Status (Device->Master)

The Output Channel ON Status message is generated when an Output channel is turned ON from a device/port. Note that when the master turns a channel ON, it assumes the channel is ON. Therefore, the device should not send this message in response to the channel being turned ON by the master.

Internally, this triggers an output event to occur in the Axcess language.

Message and Parameters:

| Field | Value(s) | Description |
| --- | --- | --- |
| MC | 0x0086 | Output Channel ON Status Value |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Output Channel OFF (Master->Device)

The Output Channel OFF message is generated when an Output channel is turned OFF from a master.

Message and Parameters:

| Field | Value(s) | Description |
| --- | --- | --- |
| MC | 0x0007 | Output Channel OFF Value |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Output Channel OFF Status (Device->Master)

The Output Channel OFF Status message is generated when an Output channel is turned OFF from a device/port. Note that when the master turns a channel OFF, it assumes the channel is OFF. Therefore, the device should not send this message in response to the channel being turned OFF by the master.

Internally, this triggers an output event to occur in the Axcess language.

Message and Parameters:

| Field | Value(s) | Description |
| --- | --- | --- |
| MC | 0x0087 | Output Channel OFF Status Value |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Input/Output Channel ON Status (Device->Master)

The Input/Output Channel ON Status message is generated when an Input/Output channel is turned ON from a device/port.

Message and Parameters:

| Field | Value(s) | Description |
| --- | --- | --- |
| MC | 0x0088 | Input/Output Channel ON Status Value |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Input/Output Channel OFF Status (Device->Master)

The Input/Output Channel OFF Status message is generated when an Input/Output channel is turned OFF from a device/port.

Message and Parameters:

| Field | Value(s) | Description |
| --- | --- | --- |
| MC | 0x0089 | Input/Output Channel OFF Status Value |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Feedback Channel ON

The Feedback Channel ON message is generated for diagnostic purposes only. See the Diagnostic Manager specification for more information.

Message and Parameters:

| Field | Value(s) | Description |
| --- | --- | --- |
| MC | 0x0018 | Feedback Channel ON |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Feedback Channel OFF

The Feedback Channel OFF message is generated for diagnostic purposes only. See the Diagnostic Manager specification for more information.

Message and Parameters:

| Field | Value(s) | Description |
| --- | --- | --- |
| MC | 0x0019 | Feedback Channel OFF |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Channel | Unsigned 16-bit value. |

Level Value (Master->Device)

This message is used to force a level value change from the master.

Message and Parameters:

| Field | Value(s) | Description |
| --- | --- | --- |
| MC | 0x000A | Level Value Change |
| MD[1 ... 2] | Device | Unsigned 16-bit value. |
| MD[3 ... 4] | Port | Unsigned 16-bit value. |
| MD[5 ... 6] | System | Unsigned 16-bit value. |
| MD[7 ... 8] | Level | Unsigned 16-bit value. |
| MD[9] | ValueType Specifier | Unsigned 8-bit value. |
| MD[10 ... n] | Value | Dynamically sized. Size indicated by MD[9]. |

The Value Type Specifier field specifies how the following data (MD[10 ... n]) is interpreted. The table below indicates the values of MD[9] as they correlate to data types.

ValueType Specifiers:

| Type | Specifier | # of Bytes |
|---|---|---|
| BYTE | 0x10 | 1 |
| CHAR | 0x11 | 1 |
| WIDECHAR | 0x20 | 2 |
| INTEGER | 0x20 | 2 |
| SINTEGER | 0x21 | 2 |
| ULONG | 0x40 | 4 |
| LONG | 0x41 | 4 |
| FLOAT | 0x4F | 4 |
| DOUBLE | 0x8F | 8 |

The LevelType command is used to query a device to determine the dynamic range supported by the device. This information is then used to generate messages appropriate to the device.

Level Value (Device->Master)

This message is used to indicate, to the master, that a device/port/level value has changed.

Message and Parameters:

| Field | Value(s) | Description |
|---|---|---|
| MC | 0x008A | Level Value Change |
| MD[1...2] | Device | Unsigned 16-bit value. |
| MD[3...4] | Port | Unsigned 16-bit value. |
| MD[5...6] | System | Unsigned 16-bit value. |
| MD[7...8] | Level | Unsigned 16-bit value. |
| MD[9] | ValueType Specifier | Unsigned 8-bit value. Reference 2.2.5.3.13 Level Value (Master->Device) for an explanation of this and the next field. |
| MD[10...n] | Value | Dynamically sized. Size indicated by MD[9]. |

String (Master->Device)

The String message is generated by the master to communicate a String. The format of a String is similar to a "C Language" string, however, the semantics are different. A String in a control system context is used to generate a "control" message. This "control" message could cause a laser disc player to begin playing a disc, display a message to the user of the system, or any number of any other uses. The string will be converted, as necessary, to any format that the device supports as determined by the StringSize message.

Message and Parameters:

| Field | Value(s) | Description |
|---|---|---|
| MC | 0x000B | String Value |
| MD[1...2] | Device | Unsigned 16-bit value. |
| MD[3...4] | Port | Unsigned 16-bit value. |
| MD[5...6] | System | Unsigned 16-bit value. |
| MD[7] | ValueType Specifier | Unsigned 8-bit value. |
| MD[8...9] | Length | Unsigned 16-bit value. Number of characters in string (i.e. number of elements, this is not the number of bytes) |
| MD[10...n] | String | Length characters. (n or n * 2 bytes) |

String ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters) |

String (Device->Master)

The String message is generated by a device, sent to the master, to communicate a String.

Message and Parameters:

| Field | Value(s) | Description |
|---|---|---|
| MC | 0x008B | String Value |
| MD[1...2] | Device | Unsigned 16-bit value. |
| MD[3...4] | Port | Unsigned 16-bit value. |
| MD[5...6] | System | Unsigned 16-bit value. |
| MD[7] | ValueType Specifier | Unsigned 8-bit value. |
| MD[8...9] | Length | Unsigned 16-bit value. Number of characters in string (i.e. number of elements, this is not the number of bytes) |
| MD[10...n] | String | Length characters. (n or n * 2 bytes) |

String ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters) |

Command (Master->Device)

The Command message is generated by the master to communicate a command string. The format of a Command is similar to a "C Language" string, however, the semantics are different. A Command in a control system context is used to generate a "control" message. This "control" message is generally intended to "command" the controlling device, not the controlled device. For example, a command to an RS232 port might enable XON/XOFF flow control. This command affected the controlling device, but not the controlled device.

Message and Parameters:

| Field | Value(s) | Description |
|---|---|---|
| MC | 0x000C | Command Value |
| MD[1...2] | Device | Unsigned 16-bit value. |
| MD[3...4] | Port | Unsigned 16-bit value. |
| MD[5...6] | System | Unsigned 16-bit value. |
| MD[7] | ValueType Specifier | Unsigned 8-bit value. |
| MD[8...9] | Length | Unsigned 16-bit value. Number of characters in string (i.e. number of elements, this is not the number of bytes) |
| MD[10...n] | Command | Length characters. (n or n * 2 bytes) |

Command ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters |

Command (Device->Master)

The Command message is generated by a device, sent to the master, to communicate a Command string.

Message and Parameters:

| Field | Value(s) | Description |
|---|---|---|
| MC | 0x008C | Command Value |
| MD[1...2] | Device | Unsigned 16-bit value. |
| MD[3...4] | Port | Unsigned 16-bit value. |
| MD[5...6] | System | Unsigned 16-bit value. |
| MD[7] | ValueType Specifier | Unsigned 8-bit value. |
| MD[8...9] | Length | Unsigned 16-bit value. Number of characters in string (i.e. number of elements, this is not the number of bytes) |
| MD[10...n] | Command | Length characters. (n or n * 2 bytes) |

Command ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters) |

Request Level Value (Master->Master)

The Request Level Value message is generated by the master to request the level value of a level.

Message and Parameters:

| Field | Value(s) | Description |
|---|---|---|
| MC | 0x000E | Request Level Value |
| MD[1...2] | Device | Unsigned 16-bit value. |
| MD[3...4] | Port | Unsigned 16-bit value. |
| MD[5...6] | System | Unsigned 16-bit value. |
| MD[7...8] | Level | Unsigned 16-bit value. |

Request Output Channel Status (Master->Master)

The Request Output Channel Status message is generated by the master to request the status of a single Output Channel or status of all Output Channels.

Message and Parameters:

| Field | Value(s) | Description |
|---|---|---|
| MC | 0x000F | Request Output Channel Status Value |
| MD[1...2] | Device | Unsigned 16-bit value. |
| MD[3...4] | Port | Unsigned 16-bit value. |
| MD[5...6] | System | Unsigned 16-bit value. |
| MD[7...8] | Channel | Unsigned 16-bit value. If zero then the request is for a status update for all channels on the specified port. |

Request Port Count (Master.->.Master)

This message requests, from the destination device, the number of ports supported by the device. The initial assumption that the master makes is that each device in the system has one port. If the device does not respond, the master assumes that it has one port.

Message and Parameters:

| Field | Value(s) | Description |
|---|---|---|
| MC | 0x0010 | Request Port Count Value |
| MD[1...2] | Device | Unsigned 16-bit value. |
| MD[3...4] | System | Unsigned 16-bit value. |

Port Count (Device->Master, Master->Master)

This message is the response from a master to the Request Port Count message above. It is sent by a device upon reporting if the device has more than one port.

Message and Parameters:

| Field | Value(s) | Description |
|---|---|---|
| MC | 0x0090 | Port Count Value |
| MD[1...2] | Device | Unsigned 16-bit value. |
| MD[3...4] | System | Unsigned 16-bit value. |
| MD[5...6] | Port Count | Unsigned 16-bit value. |

Request Output Channel Count (Master->Master)

This message requests from the destination device, the number of output channel supported by the specified device/port. The initial assumption that the master makes is that each device/port in the system has 256 channels.

Message and Parameters:

| Field | Value(s) | Description |
|---|---|---|
| MC | 0x0011 | Request Output Channel Count Value |
| MD[1...2] | Device | Unsigned 16-bit value. |
| MD[3...4] | Port | Unsigned 16-bit value. |
| MD[5...6] | System | Unsigned 16-bit value. |

Output Channel Count (Device->Master, Master->Master)

This message is the response from a master to the Request Output Channel Count message above. It is sent by a device/port upon reporting if the device has more than 256 channels.

Message and Parameters:

| Field | Value(s) | Description |
|---|---|---|
| MC | 0x0091 | Output Channel Count Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Output Channel Count | Unsigned 16-bit value. |

Request Level Count (Master->Master)

This message requests, from the destination device, the number of levels supported by the specified device/port. The initial assumption that the master makes is that each device/port in the system has eight levels.

Message and Parameters:

| Field | Value(s) | Description |
|---|---|---|
| MC | 0x0012 | Request Level Count Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |

Level Count (Device->Master,Master->Master)

This message is the response from a master to the Request Level Count message above. It is sent by a device/port upon reporting if the device has more than eight levels.

Message and Parameters:

| Field | Value(s) | Description |
|---|---|---|
| MC | 0x0092 | Level Count Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Level Count | Unsigned 16-bit value. |

Request String Size (Master->Master)

This message requests the number of elements per string and the string types supported by the device/port. The initial assumption that the master makes is that each device/port in the system supports 64 elements/string and only supports 8-bit character strings.

Message and Parameters:

| Field | Value(s) | Description |
|---|---|---|
| MC | 0x0013 | Request String Size Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |

String Size (Device->Master,Master->Master)

This message is the response from a master to the Request String Size message above. It is sent by a device/port upon reporting if the device/port supports more than 64 byte strings or more than 8-bit character strings. It returns the maximum number of elements/string the device supports and the types of strings supported.

Note that when transferring messages, the size of the message will be determined by the smaller of the maximum string size supported by the device and maximum packet size supported by the low-level bus protocol.

Message and Parameters:

| Field | Value(s) | Description |
|---|---|---|
| MC | 0x0093 | String Size Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7] | ValueType Specifier | Unsigned 8-bit value. The String ValueType Specifiers supported are ORed together into this field. |
| MD[8 . . . 9] | Length | Unsigned 16-bit value. |

String ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters |

Request Command Size (Master->Master)

This message requests the number of elements per command and the string types supported by the device/port. The initial assumption that the master makes is that each device/port in the system supports 64 elements/command and only supports 8-bit character arrays.

Message and Parameters:

| Field | Value(s) | Description |
|---|---|---|
| MC | 0x0014 | Request Command Size Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |

Command Size (Device->Master)

This message is the response, from a device, to the Request Command Size message above. It is sent by a device/port upon reporting if the device/port supports more than 64 byte commands or more than 8-bit character commands. It returns the maximum number of elements/command the device supports and the types of strings supported.

Note that when transferring messages, the size of the message will be determined by the smaller of the maximum command size supported by the device and maximum packet size supported by the low-level bus protocol.

Message and Parameters:

| Field | Value(s) | Description |
|---|---|---|
| MC | 0x0094 | String Size Value |
| MD[1 . . . 2] | Device | Unsigned 16-bit value. |
| MD[3 . . . 4] | Port | Unsigned 16-bit value. |

-continued

| Field | Value(s) | Description |
|---|---|---|
| MD[5 . . . 6] | System | Unsigned 16-bit value. |
| MD[7] | ValueType Specifier | Unsigned 8-bit value. The String ValueType Specifiers supported are ORed together into this field. |
| MD[8 . . . 9] | Length | Unsigned 16-bit value. |

String ValueType Specifiers:

| Keyword Type | Data Type | Type Specifier | Size | Range |
|---|---|---|---|---|
| CHAR Arrays | "Normal" String | 0x01 | 8-bit | Variable length strings (i.e. an array of characters) |
| WIDECHAR Arrays | "Unicode" String | 0x02 | 16-bit | Variable length strings (i.e. an array of WIDE characters) |

Request Level Size (Master->Master)

This message requests a list of data types supported for the specified level. The initial assumption that the master makes is that each device/port/level only supports 8-bit unsigned values (BYTE Type 0x10).

Message and Parameters:

| Field | Value(s) | Description |
|---|---|---|
| MC | 0x0015 | Request Level Size Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Level | Unsigned 16-bit value. |

Level Size (Device->Master,Master->Master)

This message is the response from a master to the Request Level Size message above. It is sent by a device/port upon reporting if the device/port/level supports more BYTE (Type 0x10) levels. It returns a list of data types supported by Level.

Note that when transferring levels, the master will typecast from larger sized types to the largest type supported by the device. For example, if the users Axcess[2] program sends a FLOAT to a device that supports only BYTE, CHAR, and INTEGER types, the master typecasts the FLOAT to an INTEGER before sending to the device.

Message and Parameters:

| Field | Value(s) | Description |
|---|---|---|
| MC | 0x0095 | Level Size Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | Level | Unsigned 16-bit value. |
| MD[9] | Count of ValueTypes | Unsigned 8-bit value. This is the count of bytes to follow where each byte represents a supported level type. |
| MD[10 . . . n] | List of ValueTypes | Unsigned 8-bit array of ValueTypes. |

ValueType Specifiers:

| Type | Specifier | # of Bytes |
|---|---|---|
| BYTE | 0x10 | 1 |
| CHAR | 0x11 | 1 |
| WIDECHAR | 0x20 | 2 |
| INTEGER | 0x20 | 2 |
| SINTEGER | 0x21 | 2 |
| ULONG | 0x40 | 4 |
| LONG | 0x41 | 4 |
| FLOAT | 0x4F | 4 |
| DOUBLE | 0x8F | 8 |

Request Status (Master->Master)

This message requests, from the destination device, the status of the device or port.

Message and Parameters:

| Field | Value(s) | Description |
|---|---|---|
| MC | 0x0016 | Request Status Code Value |
| MD[1 . . . 2] | Device | Unsigned 16-bit value. |
| MD[3 . . . 4] | Port | Unsigned 16-bit value. If port = 0 then requesting status of device. |
| MD[5 . . . 6] | System | Unsigned 16-bit value. |

Status (Device->Master,Master->Master)

This message is the response from a master to the Request Status Code message above. It is sent by a device/port if the device/port needs to update the master of a status change.

Message and Parameters:

| Field | Value(s) | Description |
|---|---|---|
| MC | 0x0096 | Status Code Value |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 8] | StatusCode | Unsigned 16-bit value. If port = 0 then status of device instead of port. |
| MD[9] | ValueType Specifier | Unsigned 8-bit value. Type of StatusString. |
| MD[10 . . . 11] | Length | Unsigned 16-bit value. Number of characters in string (i.e. number of elements, this is not the number of bytes) |
| MD[12 . . . n] | StatusString | Length characters. (n or n * 2 bytes) |

Request Device Info (Master->Device)

This message requests device specific information from the specified device.

Message and Parameters:

| Field | Value(s) | Description |
|---|---|---|
| MC | 0x0017 | Request Device Info Value |
| MD[1 . . . 2] | Device | Unsigned 16-bit value. |
| MD[3 . . . 4] | System | Unsigned 16-bit value. |

Device Info (Device->Master)

This message is the response to the Request Device Info message above.

Flag—A 16-bit bit field. Each bit indicates a unique aspect of functionality.

For each device and sub-device that contains re-programmable electronic components within the device, the following information is replied:

ObjectID—An 8-bit unique (within the device) identifier that identifies this structure of information. This is used to construct an internal device hierarchy for display to the user.

ParentID—An 8-bit value that references an existing ObjectID. If 0, then this object has no parent.

ManufactureID—A 16-bit value that uniquely identifies the manufacture of the device.

DeviceID—A 16-bit value that uniquely identifies the device type.

Serial number—A fixed length field 16 bytes long.

FWID (Firmware ID)—A 16-bit value that uniquely identifies the object code that the device requires.

Version—A NULL terminated text string that indicates the revision level of the re-programmable component.

DeviceID String—A NULL terminated text string that indicates the name or model number of the device.

Manufacturer String—A NULL terminated text string that indicates the name of the device manufacturer.

Extended Address Format—An 8-bit value that indicates the type of device specific addressing information to follow.

Extended Address Length—An 8-bit value that indicates the length of device specific addressing information to follow.

Extended Address—Extended Address as indicated by Extended Address Type and Length.

Message and Parameters:

Extended Address Type

| Type | Description |
| --- | --- |
| 0x01 | Neuron ID. Length will be 6 and address will be the 48-bit Neuron ID of the device. |
| 0x02 | IP4 Address. Length will be 4 and address will be the 4-byte IP address of the device |
| 0x03 | AXLink Connection. Length must be 0. |
| 0x13 | RS232 Connection. Length must be 0. |
| All others | Reserved. |

Device Info EOT (Master->Device)

This message indicates that all data (Device Info messages) have been sent as a result of a Request Device Info message. This message indicates to the requesting device that all Device Info information has been provided.

Message and Parameters:

| Field | Value(s) | Description |
| --- | --- | --- |
| MC | 0x0098 | Device Info EOT Value |
| MD[1 ... 2] | Device | Unsigned 16-bit value. |
| MD[3 ... 4] | System | Unsigned 16-bit value. |

Request Master Status (Device->Master,Master->Master)

This message requests that the master respond with its status. Generally, Master Status message will be unsolicited, this message is included for completeness.

| Field | Value(s) | Description |
| --- | --- | --- |
| MC | 0x0097 | Device Info Value |
| MD[1 ... 2] | Device | Unsigned 16-bit value. |
| MD[3 ... 4] | System | Unsigned 16-bit value. |
| MD[5 ... 6] | Flag | 16-bit bit field. Bit 0 - If set, this message was generated in response to a button press while Identify mode is active. |
| MD[7] | ObjectID | Unsigned 8-bit value. |
| MD[8] | ParentID | Unsigned 8-bit value. |
| MD[9 ... 10] | MfgID | Unsigned 16-bit value. |
| MD[11 ... 12] | DeviceID | Unsigned 16-bit value. |
| MD[13 ... 28] | SerialNumber | 16 bytes of data. Format not defined yet. |
| MD[29 ... 30] | FWID | Unsigned 16-bit value. |
| MD[31 ... n] | Version | CHAR array, NULL terminated, containing a version string. Generally, in this format: "v1.00\0" |
| MD[n + 1 ... p] | DeviceID String | CHAR array, NULL terminated, containing a model number. Generally, in this format: "NXC-232\0" (NetLinx Card-RS232) |
| MD[p + 1 ... q] | Manufacture String | CHAR array, NULL terminated, containing the mfg.'s name. Generally, in this format: "AMX Corp/0" |
| MD[q + 1] | Extended Address Type | 8-bit value. Used to indicate type of extended address to follow. |
| MD[q + 2] | Extended Address Length | 8-bit value. Used to indicate length in bytes of extended address to follow |
| MD[q + 3 ... r] | Extended Address | Extended Address as indicated by Address Type and Length. |

Message and Parameters:

| Field | Value(s) | Description |
|---|---|---|
| MC | 0x00A1 | Request Master Status Value |
| MD[1...2] | System | Unsigned 16-bit value. |

Master Status (Master->Device,Master->Master)

This message is the response to the Request Master Status message above, but more commonly will be sent by the master unsolicited.

Message and Parameters:

| Field | Value(s) | Description |
|---|---|---|
| MC | 0x0021 | Master Status Value |
| MD[1...2] | System | Unsigned 16-bit value. |
| MD[3...4] | Status | Unsigned 16-bit value treated as bit fields. See below. |
| MD[5...n] | StatusString | CHAR array, NULL terminated, containing a text description of the status. For example, "Master Reset" |

Master Status is defined as follows:
Bits 1 & 0 are encoded as shown in the table below.

| Bit 1 State | Bit 0 State | Meaning |
|---|---|---|
| 0 | 0 | Reset<br>When a device receives this status of the master all channels on the device should be turned off, all levels should be set to zero, and the device shall enter the "unconnected" state (see the Device & Master Communication Specification) |
| 0 | 1 | Reload<br>When a device receives this status of the master, it must stop sending messages to the master until the master's status becomes Normal. No channels are turned off. |
| 1 | 0 | Undefined |
| 1 | 1 | Normal<br>Upon entry in to the Normal state, the device must report that it is on-line and any channels that are ON, or non-zero levels must be reported to the master. |

Bits 15-2: Undefined should be zero.

Diagnostic Manager

The following messages originate from or are destined for the Diagnostic Manager:

The Diagnostic Messages will be better specified during/after the Diagnostic Manager specification is complete.

| Command | Value | Description |
|---|---|---|
| Internal Diagnostic String | 0x0101 | Used to display/convey a diagnostic message. It includes a severity level, module ID, and a string. These messages are generated internally within the master. |
| Request Diagnostic Information | 0x0102 | Registers the sending device with the diagnostic manager such that diagnostic information be sent the source device. |
| Request Devices On-line | 0x0103 | Master responds with Device Info message(s) for each device currently on-line and the number of ports for each device. |
| Request Devices On-line EOT | 0x0109 | Indicates that all on-line device information has been sent. |
| Request Device Status | 0x0104 | Master responds with a variety of messages that indicate the current state of the device. |
| Request Device Status EOT | 0x010A | Indicates that all Device Status information has been sent. |
| Request Asynchronous Notification List | 0x0105 | Requests the entire list of device/ports currently in the Master's asynchronous notification list. |
| Asynchronous Notification List | 0x0106 | Contains a single entry from the Master's asynchronous notification list. |
| Add/modify asynchronous Notification List | 0x0107 | Adds or modifies an entry in the Master's asynchronous notification list. |
| Delete asynchronous Notification List | 0x0108 | Delete one or all entries in the Master's asynchronous notification list. |

Internal Diagnostic String

This message is used by tasks within the master to log/display error or diagnostic messages.

Message and Parameters:

| Field | Value(s) | Description |
|---|---|---|
| MC | 0x0101 | Internal Diagnostic String |
| MD[1...2] | Object ID | Unsigned 16-bit value. Values defined in the Constants & IDs specification document. |

| Field | Value(s) | Description |
|---|---|---|
| MD[3...4] | Severity | Unsigned 16-bit value. |
| MD[5...n] | Diagnostic String | CHAR array, NULL terminated, containing text description of the error. For example, "Self-test failed #2" |

Request Diagnostic Information

This message is used by the IDE to request that diagnostic information be sent to the requesting device. If any flag bits are set, unsolicited diagnostic messages of the specified type(s) will be sent to the device. If all bits are zero, then no diagnostic message will be sent to the device.

Message and Parameters:

| Field | Value(s) | Description |
|---|---|---|
| MC | 0x0102 | Request Diagnostic Information |
| MD[1...2] | Flag | Bit Field:<br>0 - Enable Internal Diagnostic Strings<br>1-15 - Undefined (must be 0) |

Request Devices Online

This message is used by the IDE to request a list of online devices for the receiving NetLinx master. The master will respond with Device Info message(s) for each device currently online. In addition, it will generate a Port Count message for each device.

Message and Parameters:

| Field | Value(s) | Description |
|---|---|---|
| MC | 0x0103 | Request Devices Online |

Request Devices Online EOT

This message indicates that all requested devices from the Request Devices Online message have been sent. This message is used by the IDE to determine when all online device information has been received.

Message and Parameters:

| Field | Value(s) | Description |
|---|---|---|
| MC | 0x0109 | Request Devices Online |

Request Device Status

This message is used by the IDE to request the status of the specified device. The master responds with Output ON messages for each output channel that is on, Feedback ON messages for each feedback channel that is on, etc. See the Diagnostic Manager specification for more information.

Message and Parameters:

| Field | Value(s) | Description |
|---|---|---|
| MC | 0x0104 | Request Device Status |
| MD[1...2] | Device | Unsigned 16-bit value. |
| MD[3...4] | Port | Unsigned 16-bit value. |
| MD[5...6] | System | Unsigned 16-bit value. |

Request Device Status EOT

This message indicates that all of the Request Device Status information has been sent. This message is used by the IDE to determine when all device status information has been received.

Message and Parameters:

| Field | Value(s) | Description |
|---|---|---|
| MC | 0x010A | Request Device Status |
| MD[1...2] | Device | Unsigned 16-bit value. |
| MD[3...4] | Port | Unsigned 16-bit value. |
| MD[5...6] | System | Unsigned 16-bit value |

Request Asynchronous Notification List

This message is used by the IDE to request the current asynchronous notification list from the master. The master generates a series of Asynchronous Notification List messages, one for each entry in the list, to the requesting device.

Message and Parameters:

| Field | Value(s) | Description |
|---|---|---|
| MC | 0x0105 | Request Asynchronous Notification List |

Asynchronous Notification List

This message is generated by the master in response to the Request Asynchronous Notification List message. For each entry in the master's list, one of these messages will be generated. If there are no entries, then the number of entries field will be zero. See the Diagnostic Manager specification for more information.

Message and Parameters:

| Field | Value(s) | Description |
|---|---|---|
| MC | 0x0106 | Asynchronous Notification List |
| MD[1...2] | Total Count | Unsigned 16-bit value containing the total number of entries in the list. |
| MD[3...4] | This Index | Unsigned 16-bit value containing the item number beginning with 1. This will be incremented for each item until it equals Total Count. |
| MD[5...6] | Device | Unsigned 16-bit value. |
| MD[7...8] | Port | Unsigned 16-bit value. |
| MD[9...10] | System | Unsigned 16-bit value. |
| MD[11...14] | Flag | 32 Bit field (if the bit is set, the messages are enabled):<br>Bit - 0: Online/offline messages<br>Bit - 1: Configuration messages<br>Bit - 2: Input channel changes<br>Bit - 3: Output channel changes<br>Bit - 4: Feedback channel changes<br>Bit - 5: Level changes from device |

| Field | Value(s) | Description |
|---|---|---|
| | | Bit - 6: Level changes to device |
| | | Bit - 7: Strings from device |
| | | Bit - 8: Strings to device |
| | | Bit - 9: Commands from device |
| | | Bit - 10: Commands to device |
| | | Bit - 11: Status messages |
| | | Bit 12-31: Undefined. Should be zero. |

Add/Modify Asynchronous Notification List

This message is used to add an entry into the Asynchronous Notification List or modify an existing entry. The master will generate a Completion Code (Configuration Manager message 0x0213) message indicating success or failure of this command. A special sentinel value of Device=0, Port=0, and System=0 indicates that the flags should be applied to the global filter.

Message and Parameters:

| Field | Value(s) | Description |
|---|---|---|
| MC | 0x0107 | Add/Modify Asynchronous Notification List |
| MD[1...2] | Device | Unsigned 16-bit value. |
| MD[3...4] | Port | Unsigned 16-bit value. |
| MD[5...6] | System | Unsigned 16-bit value. |
| MD[7...10] | Flag | 32 Bit field (if the bit is set, the messages are enabled): |
| | | Bit 0: Online/offline messages |
| | | Bit - 1: Configuration messages |
| | | Bit - 2: Input channel changes |
| | | Bit - 3: Output channel changes |
| | | Bit - 4: Feedback channel changes |
| | | Bit - 5: Level changes from device |
| | | Bit - 6: Level changes to device |
| | | Bit - 7: Strings from device |
| | | Bit - 8: Strings to device |
| | | Bit - 9: Commands from device |
| | | Bit - 10: Commands to device |
| | | Bit - 11: Status messages |
| | | Bit 12-31: Undefined. Should be zero. |

Delete Asynchronous Notification List

This message is used to delete an/all entr(y)/(ies) from the Asynchronous Notification List. The master will generate a Completion Code (Configuration Manager message 0x0213) message indicating success or failure of this command. A special sentinel value of Device=0, Port=0, and System=0 indicates that the global filter should be deleted. Another special sentinel value of Device=65535, Port=65535, and System=65535 indicates that all entries should be deleted.

Message and Parameters:

| Field | Value(s) | Description |
|---|---|---|
| MC | 0x0108 | Add/Modify Asynchronous Notification List |
| MD[1...2] | Device | Unsigned 16-bit value. |
| MD[3...4] | Port | Unsigned 16-bit value. |
| MD[5...6] | System | Unsigned 16-bit value. |

Connection Manager Messages

Table B lists commands between connection manager and devices. Again, the first column is the name of the command, the second column is the value of the command, the third column is the device response, the fourth column is the master response and the last column is the description of the command. For example, on the second row, if the blink command sent by a master to a device, the value of the command is 0x0502 and in response to that command the device says nothing nor does the master. The description of the command is given to all devices to make the LED blink. As this occurs, the master determines whether the device is online and sends back a visual indication.

TABLE B

| Command | Value | Valid Response Messages From | | Description |
| | | DEVICE | MASTER | |
|---|---|---|---|---|
| Ping Request (Master->Device) | 0x0501 | 0x0581 | 0x0581 | Requests a ping response from the destination device. |
| Ping Response (Device->Master) | 0x0581 | None | None | Reply to the Ping Request. The master uses the response to confirm that the device is active in the system. |
| Blink (Master->Device) | 0x0502 | None | None | Periodically broadcast to all devices. Includes LED blink and other information. |
| Request Blink (Device->Master) | 0x0582 | Error | 0x0502 | Requests a Blink message. Intended to be generated by one master to another. |
| Dynamic Device Address (Master->Device) | 0x0503 | 0x0001 | 0x0001 | Assigned address response. |
| Request Dynamic Device Address (Device->Master) | 0x0583 | Error | 0x0503 | Request a dynamic address . . . use the Newbee flag. |

TABLE B-continued

| Command | Value | Valid Response Messages From DEVICE | Valid Response Messages From MASTER | Description |
|---|---|---|---|---|
| Pass Through (Device->Master) | 0x0584 | Error | 0x0001 | Requests that strings from the specified device get sent to another specified device. |
| Request Notification (Master->Master) | 0x0507 | Error | 0x0001 | Requests notification of specific messages from a device. |

Ping Request (Master->Device)

This message is sent by a master to request determine the presence of the specified device in the system.

| Field | Value(s) | Description |
|---|---|---|
| MC | 0x0501 | PingRequest value |
| MD[1 ... 2] | Device | Unsigned 16-bit value. |
| MD[3 ... 4] | System | Unsigned 16-bit value |

Ping Response (Device->Master)

This message is the response to the Ping Request message above. The device responds with this message to inform the requester that the device is still on-line.

| Field | Value(s) | Description |
|---|---|---|
| MC | 0x0581 | PingResponse value |
| MD[1 ... 2] | Device | Unsigned 16-bit value. |
| MD[3 ... 4] | System | Unsigned 16-bit value. |
| MD[5 ... 6] | MfgID | Unsigned 16-bit value. The Manufacture ID as reported in the Device Info message for ParentID = 0 and ObjectID = 0 |
| MD[7 ... 8] | DeviceID | Unsigned 16-bit value. The Device ID as reported in the Device Info message for ParentID = 0 and ObjectID = 0 |
| MD[9] | Extended Address Type | 8-bit value. Used to indicate type of extended address to follow. |
| MD[10] | Extended Address Length | 8-bit value. Used to indicate length in bytes of extended address to follow |
| MD[11 ... ] | Extended Address | Extended address as indicated by Extended Address Type and Length. |

Extended Address Type

| Type | Description |
|---|---|
| 0x01 | Neuron ID. Length will be 6 and address will be the 48-bit Neuron ID of the device. |
| 0x02 | IP4 Address. Length will be 4 and address will be the 4-byte IP address of the device |
| 0x03 | AXLink Connection. Length must be 0. |
| 0x13 | RS232 Connection. Length must be 0. |
| All others | Reserved. |

Blink (Master->Device)

The blink message is a broadcast message that is transmitted to every device periodically. The time period of the message may be dependent upon the medium in which the message will be sent.

Message and Parameters:

| Field | Value(s) | Description |
|---|---|---|
| MC | 0x0502 | Blink Value |
| MD[0] | Heartbeat Timing | Tenths of seconds between heartbeats. |
| MD[1] | LED | State of Bus LED and other Status. Bit 0 - Bus LED 0 = OFF, 1 = ON. Bits 1-6 Reserved. Bit 7 - Forced Device Unconfigure/Reset |
| MD[2] | Month | Current Date: Month 1-12 |
| MD[3] | Day | Day 1-31 |
| MD[4 ... 5] | Year | Year 1999-65535 (Type: unsigned 16-bit) |
| MD[6] | Hour | Current Time: Hour 0-23 |
| MD[7] | Minute | Minute 0-59 |
| MD[8] | Second | Seconds 0-59 |
| MD[9] | Day of Week | 0 = Mon, 1 = Tues, ... |
| MD[10 ... 11] | Outside Temp | Outside Temperature (if available). [Type: signed 16-bit) If 0x8000, then temperature is not valid. |
| MD[12 ... n] | Text Date String | CHAR array, NULL terminated, Formatted as: "Thursday, Jun. 10, 1999" |

The time period for Blink messages is not determined at this time. Each device implementation may not require that the Blink message be periodically sent at any anticipated rate. The ideal rate will be determined based upon the quantity of bus traffic. It may, someday, even be determined dynamically.

The LED byte is a bit field. The LSB (bit 0) indicates the current status of the bus LED.

The MSB (Bit 7) is set when the master initially powers-up/on-line. In response to bit 7 being set, the receiving device should place itself in the off-line state, turn all channels off, and set all levels to zero (or prepare itself to send status updates as necessary to the master). The master shall send 3 consecutive blink messages with bit 7 set.

Request Blink (Device->Master)

This message requests from the destination master, a Blink message response. The response will not be a global response, it will be destined only to the requester.

Message and Parameters:

| Field | Value(s) | Description |
|---|---|---|
| MC | 0x0582 | ReqBlink Value |
| MD[1 ... 2] | System | Unsigned 16-bit value. |

Dynamic Device Address (Master->Device)

This message is the response to the Request Dynamic Device Address message below. It returns a device number for "temporary" use by the requesting device.

The device can use this device number for as long as it has communication with the master. The returned device number may the one suggested by the device in the Request Dynamic Device Address message or may be different.

Message and Parameters:

| Field | Value(s) | Description |
| --- | --- | --- |
| MC | 0x0503 | DynDevAddress Value |
| MD[1 . . . 2] | Device | Unsigned 16-bit value. Newly assigned or Requested device number for the device's use. |
| MD[3 . . . 4] | System | Unsigned 16-bit value. The appropriate system number. |

Request Dynamic Device Address (Device->Master)

This message requests a device number from a master. The Newbee flag must be set in the message header.

Message and Parameters:

| Field | Value(s) | Description |
| --- | --- | --- |
| MC | 0x0583 | Request Dynamic Device Address Value |
| MD[1 . . . 2] | ProposedDevice | Unsigned 16-bit value. If possible for the device, is the last device number that this device used. |
| MD[3] | Extended Address Type | 8-bit value. Used to indicate type of extended address to follow. |
| MD[4] | Extended Address Length | 8-bit value. Used to indicate length in bytes of extended address to follow |
| MD[5 . . . ] | Extended Address | Extended address as indicated by Extended Address Type and Length. |

Extended Address Type

| Type | Description |
| --- | --- |
| 0x01 | Neuron ID. Length will be 6 and address will be the 48-bit Neuron ID of the device. |
| 0x02 | IP4 Address. Length will be 4 and address will be the 4-byte IP address of the device. |
| 0x03 | AXLink Connection. Length must be 0. |
| 0x13 | RS232 Connection. Length must be 0. |
| All others | Reserved. |

Pass Through

This message requests that the Connection manager redirect strings coming from the specified source device to the specified destination device. This will also prohibit strings from the source device getting sent to the interpreter until the PassThrough is disabled. This message will cause an 'RXON' message to be sent to the source AXLink device.

Message and Parameters:

| Field | Value(s) | Description |
| --- | --- | --- |
| MC | 0x0584 | Pass Through Value |
| MD[1 . . . 2] | SrcDevice | Unsigned 16-bit value. Source AXLink device. |
| MD[3 . . . 4] | DstDevice | Unsigned 16-bit value. Destination device address. |
| MD[5 . . . 6] | DstPort | Unsigned 16-bit value. Destination Device Port address. |
| MD[7 . . . 8] | DstSystem | Unsigned 16-bit value. Destination System Address. |
| MD[9] | Enable | Unsigned 8-bit value. Bit field: Bit 0-1 = Enable pass through. 0 = disable. |

Request Notification

This message is sent by a master to request notification of specific messages that are received from OR sent to the specified device. Typically, the notification messages are Device Manager messages (specified above).

| Field | Value(s) | Description |
| --- | --- | --- |
| MC | 0x0507 | RequestNotification value |
| MD[1 . . . 2] | DstSystem | Unsigned 16-bit value. The destination system of this (RequestNotification) message. |
| MD[3 . . . 4] | DstDevice | Unsigned 16-bit value. The specific source device of interest. |
| MD[5 . . . 6] | SrcSystem | Unsigned 16-bit value. The system requesting the notification messages. |
| MD[7 . . . 8] | SrcDevice | Unsigned 16-bit value. The device requesting the notification messages. |
| MD[9 . . . 10] | MessageCount | Unsigned 16-bit value. Number of messages in following list. |
| MD[11 . . . n] | Messages | Array of unsigned 16-bit values. Each value identifies a specific message. For example, 0x000A indicates that any Level Value messages to or from Device should be sent to SrcSystem. |

The following message command values are not actual messages, but rather virtual "commands" to the Notification Manager that function as follows:

0xFFFF—deletes all existing notification requests for the device from this master.

Diagnostic Manager

The following messages originate from or are destined for the Diagnostic Manager:

| Command | Value | Description |
| --- | --- | --- |
| Internal Diagnostic String | 0x0101 | Used to display/convey a diagnostic message. It includes a severity level, module ID, and a string. These messages are generated internally within the master. |
| Request Diagnostic Information | 0x0102 | Registers the sending device with the diagnostic manager such that diagnostic information be sent the source device. |

-continued

| Command | Value | Description |
| --- | --- | --- |
| Request Devices On-line | 0x0103 | Master responds with Device Info message(s) for each device currently on-line and the number of ports for each device. |
| Request Devices On-line EOT | 0x0109 | Indicates that all on-line device information has been sent. |
| Request Device Status | 0x0104 | Master responds with a variety of messages that indicate the current state of the device. |
| Request Device Status EOT | 0x010A | Indicates that all Device Status information has been sent. |
| Request Asynchronous Notification List | 0x0105 | Requests the entire list of device/ports currently in the Master's asynchronous notification list. |
| Asynchronous Notification List | 0x0106 | Contains a single entry from the Master's asynchronous notification list. |
| Add/modify asynchronous Notification List | 0x0107 | Adds or modifies an entry in the Master's asynchronous notification list. |
| Delete asynchronous Notification List | 0x0108 | Delete one or all entries in the Master's asynchronous notification list. |

Internal Diagnostic String

This message is used by tasks within the master to log/display error or diagnostic messages.

Message and Parameters:

| Field | Value(s) | Description |
| --- | --- | --- |
| MC | 0x0101 | Internal Diagnostic String |
| MD[1 . . . 2] | Object ID | Unsigned 16-bit value. Values defined in the Constants & IDs specification document. |
| MD[3 . . . 4] | Severity | Unsigned 16-bit value. |
| MD[5 . . . n] | Diagnostic String | CHAR array, NULL terminated, containing a text description of the error. For example, "Self-test failed #2" |

Request Diagnostic Information

This message is used by the IDE to request that diagnostic information be sent to the requesting device. If any flag bits are set, unsolicited diagnostic messages of the specified type(s) will be sent to the device. If all bits are zero, then no diagnostic message will be sent to the device.

Message and Parameters:

| Field | Value(s) | Description |
| --- | --- | --- |
| MC | 0x0102 | Request Diagnostic Information |
| MD[1 . . . 2] | Flag | Bit Field:<br>0 - Enable Internal Diagnostic Strings<br>1-15 - Undefined (must be 0) |

Request Devices Online

This message is used by the IDE to request a list of online devices for the receiving NetLinx master. The master will respond with Device Info message(s) for each device currently online. In addition, it will generate a Port Count message for each device.

Message and Parameters:

| Field | Value(s) | Description |
| --- | --- | --- |
| MC | 0x0103 | Request Devices Online |

Request Devices Online EOT

This message indicates that all requested devices from the Request Devices Online message have been sent. This message is used by the IDE to determine when all online device information has been received.

Message and Parameters:

| Field | Value(s) | Description |
| --- | --- | --- |
| MC | 0x0109 | Request Devices Online |

Request Device Status

This message is used by the IDE to request the status of the specified device. The master responds with Output ON messages for each output channel that is on, Feedback ON messages for each feedback channel that is on, etc. See the Diagnostic Manager specification for more information.

Message and Parameters:

| Field | Value(s) | Description |
| --- | --- | --- |
| MC | 0x0104 | Request Device Status |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |

Request Device Status EOT

This message indicates that all of the Request Device Status information has been sent. This message is used by the IDE to determine when all device status information has been received.

Message and Parameters:

| Field | Value(s) | Description |
| --- | --- | --- |
| MC | 0x010A | Request Device Status |
| MD[1 . . . 2] | Device | Unsigned 16-bit value. |
| MD[3 . . . 4] | Port | Unsigned 16-bit value. |
| MD[5 . . . 6] | System | Unsigned 16-bit value |

Request Asynchronous Notification List

This message is used by the IDE to request the current asynchronous notification list from the master. The master generates a series of Asynchronous Notification List messages, one for each entry in the list, to the requesting device.

Message and Parameters:

| Field | Values(s) | Description |
| --- | --- | --- |
| MC | 0x0105 | Request Asynchronous Notification List |

Asynchronous Notification List

This message is generated by the master in response to the Request Asynchronous Notification List message. For each entry in the master's list, one of these messages will be generated. If there are no entries, then the number of entries field will be zero. See the Diagnostic Manager specification for more information.

Message and Parameters:

| Field | Values(s) | Description |
| --- | --- | --- |
| MC | 0x0106 | Asynchronous Notification List |
| MD[1 . . . 2] | Total Count | Unsigned 16-bit value containing the total number of entries in the list. |
| MD[3 . . . 4] | ThisIndex | Unsigned 16-bit value containing the item number beginning with 1. This will be incremented for each item until it equals Total Count. |
| MD[5 . . . 6] | Device | Unsigned 16-bit value. |
| MD[7 . . . 8] | Port | Unsigned 16-bit value. |
| MD[9 . . . 10] | System | Unsigned 16-bit value. |
| MD[11 . . . 14] | Flag | 32 Bit field (if the bit is set, the messages are enabled):<br>Bit-0: Online/offline messages<br>Bit-1: Configuration messages<br>Bit-2: Input channel changes<br>Bit-3: Output channel changes<br>Bit-4: Feedback channel changes<br>Bit-5: Level changes from device<br>Bit-6: Level changes to device<br>Bit-7: Strings from device<br>Bit-8: Strings to device<br>Bit-9: Commands from device<br>Bit-10: Commands to device<br>Bit-11: Status messages<br>Bit 12-31: Undefined. Should be zero |

Add/Modify Asynchronous Notification List

This message is used to add an entry into the Asynchronous Notification List or modify an existing entry. The master will generate a Completion Code (Configuration Manager message 0x0213) message indicating success or failure of this command. A special sentinel value of Device=0, Port=0, and System=0 indicates that the flags should be applied to the global filter.

Message and Parameters:

| Field | Values(s) | Description |
| --- | --- | --- |
| MC | 0x0107 | Add/Modify Asynchronous Notification List |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |
| MD[7 . . . 10] | Flag | 32 Bit field (if the bit is set, the messages are enabled):<br>Bit-0: Online/offline messages<br>Bit-1: Configuration messages<br>Bit-2: Input channel changes<br>Bit-3: Output channel changes<br>Bit-4: Feedback channel changes<br>Bit-5: Level changes from device<br>Bit-6: Level changes to device<br>Bit-7: Strings from device<br>Bit-8: Strings to device<br>Bit-9: Commands from device<br>Bit-10: Commands to device<br>Bit-11: Status messages<br>Bit 12-31: Undefined. Should be zero. |

Delete Asynchronous Notification List

This message is used to delete an/all entr(y)/(ies) from the Asynchronous Notification List. The master will generate a Completion Code (Configuration Manager message 0x0213) message indicating success or failure of this command. A special sentinel value of Device=0, Port=0, and System=0 indicates that the global filter should be deleted. Another special sentinel value of Device=65535, Port=65535, and System=65535 indicates that all entries should be deleted.

Message and Parameters:

| Field | Value(s) | Description |
| --- | --- | --- |
| MC | 0x0108 | Add/Modify Asynchronous Notification List |
| MD[1 . . . 2] | Device | Unsigned 16-bit value. |
| MD[3 . . . 4] | Port | Unsigned 16-bit value. |
| MD[5 . . . 6] | System | Unsigned 16-bit value. |

Configuration Manager

The following messages originate from or are destined for the Configuration Manager:

| Command | Value | Valid Response Messages From | | Description |
| --- | --- | --- | --- | --- |
| | | DEVICE | MASTER | |
| Set Device Number (Master->Device, Master->Master) | 0x0201 | 0x0213 | 0x0213 | Sets the device/system number of the receiving device. |
| Set Identify Mode/Address (Master->Device) | 0x0202 | None | None | Enables/Disables identify mode for the device and establishes the new device number. |
| Set Serial Number | 0x0203 | 0x0213 | 0x0213 | Sets the 16-byte serial number of the device. |

| Command | Value | Valid Response Messages From DEVICE | Valid Response Messages From MASTER | Description |
|---|---|---|---|---|
| File Transfer | 0x0204 | 0x0204 | 0x0204 | Contains file transfer information |
| Request IP Address List | 0x0205 | 0x0206 | 0x0206 | Requests the list of IP address the device will attempt to contact list. |
| IP Address List | 0x0206 | None | None | List of IP address |
| Add IP Address | 0x0207 | 0x0213 | 0x0213 | Add the specified IP address to the contact list. |
| Delete IP Address | 0x0208 | 0x0213 | 0x0213 | Delete an specified IP address from the contact list. |
| Set DNS IP Addresses | 0x0209 | 0x0213 | 0x0213 | Sets the DNS IP address list and domain name. |
| Request DNS IP Addresses | 0x020A | 0x020B | 0x020B | Requests the DNS IP address list and domain name. |
| Get DNS IP Addresses | 0x020B | None | None | Gets the DNS IP address list and domain name. |
| Set Ethernet IP Address | 0x020C | 0x0213 | 0x0213 | Sets the IP address, subnet mask, and gateway. |
| Request Ethernet IP Address | 0x020D | 0x020D | 0x020D | Requests the Ethernet interface's IP address, subnet mask, and gateway. |
| Get Ethernet IP Address | 0x020E | None | None | Response to Request Ethernet IP Address. |
| Set Time & Date | 0x020F | 0x0213 | 0x0213 | Sets the Time and Date. |
| Request Time & Date | 0x0210 | 0x0211 | 0x0211 | Requests the current Time and Date. |
| Get Time & Date | 0x0211 | None | None | Gets the current Time and Date. |
| Identify Mode/Address Response | 0x0282 | None | None | Response to Identify Mode/Address. |
| Restart | 0x0212 | 0x0213 | 0x0213 | Restart device or subset of device. |
| Completion Code | 0x0213 | None | None | For some messages, confirms successful completion or failure of a message. |
| Reserved Messages | 0x02E0-0x02FF | | | Reserved message range. |

Set Device Number

Used to set the Device number of un-configured devices.

| Field | Value(s) | Description |
|---|---|---|
| MC | 0x0201 | Set Device number. |
| MD[1] | Configuration Flags | Used to indicate the type of configuration and the validity of the following data. |
| MD[2...3] | Device Number | Unsigned 16-bit value. The specific device number to become. |
| MD[4...5] | System | Unsigned 16-bit value. The specific system number to set. |

Configuration Flags

| Bit Value | Type | Description |
|---|---|---|
| 0x01 | Device Field Valid | Device Number in data is valid and should be stored. |
| 0x02 | System Field Valid | System Number in data is valid and should be stored. |
| 0x04 | Future | |
| 0x08 | Future | |
| 0x10 | Future | |
| 0x20 | Future | |
| 0x40 | Future | |
| 0x80 | Erase all Current System/Device Settings | Erase current setting and return to default. |

Set Identify Mode/Address

Places/removes the device into/from the Identify state. While the device is in the identify state, a press of the identify button causes the device to take on the specified Device/System. The device should respond with the Identify Mode/Address Response, report its old device as off-line, then report the new device as on-line.

| Field | Value(s) | Description |
|---|---|---|
| MC | 0x0202 | Set Identify mode |
| MD[1] | Flags | Unsigned 8-bit value. Bit 0: 0 - Disable Identify Mode 1 - Enable Identify Mode |
| MD[2...3] | NewDevice | Unsigned 16-bit value. New device number. |
| MD[4...5] | NewSystem | Unsigned 16-bit value. New system number. |

Set Serial Number

Used to set the serial number of the specified device.

| Field | Value(s) | Description |
|---|---|---|
| MC | 0x0203 | Set Serial Number. |
| MD[1 . . . 16] | Serial Number | The devices 16-byte serial number. This serial number is reported via the Device Info message. |

File Transfer

This command initiates the transfer of data for a device or master. It is intended that this transfer mechanism be common to all types of file transfers including firmware upgrades, IR data, touch panel design files.

| Field | Value(s) | Description |
|---|---|---|
| MC | 0x0204 | File Transfer |
| MD[1 . . . 2] | FileType | Unsigned 16-bit value:<br>0 = Unused<br>1 = IR Data<br>2 = Firmware<br>3 = Touch Panel File<br>4 = Axcess2 Tokens |
| MD[3 . . . 4] | Function | The function to execute, such as receive, send, etc. Values 0-255 are predefined. All other values are based upon the FileType. |
| MD[5 . . . n] | Data | It any, contains Function specific data. |

Request IP Address List

Requests for the device to respond with the list of IP addresses the device or master attempts to contact.

| Field | Value(s) | Description |
|---|---|---|
| MC | 0x0205 | Request IP Address List |

IP Address List

The response to the request above, one IP Address List message will be generated for each IP address in the list.

| Field | Value(s) | Description |
|---|---|---|
| MC | 0x0206 | IP Address List |
| MD[1 . . . 2] | Total Count | Unsigned 16-bit value containing the total number of addresses. |
| MD[3 . . . 4] | ThisIndex | Unsigned 16-bit value containing the item number beginning with 1. This will be incremented for each address until it equals Total Count. |
| MD[5] | Flag | Bit field:<br>Bit-0: Connection Mode.<br>0 = UDP connection<br>1 = TCP connection<br>Bit-1: Unused<br>Bit-2: Unused<br>Bit-3: Unused<br>Bit-4: Unused<br>Bit-5: Source of Entry<br>0 = IDE generated<br>1 = NetLinx Language generated |

-continued

| Field | Value(s) | Description |
|---|---|---|
| | | Bits-6 & 7: Encoded connection state<br>00 = (0x00) Looking up URL<br>01 = (0x40) Attempting connection<br>10 = (0x80) Waiting for connection valid<br>11 = (0xC0) Connected |
| MD[6 . . . 7] | Port Number | Unsigned 16-bit value containing the port number to connect. |
| MD[8 . . . n] | URL | Null terminated address string. Either a URL, or IP address in the form of "192.168.26.148" |
| MD[n + 1 . . . p] | IP Address | Null terminated IP address string. If the URL has been lookup up, Contains the IP address of the URL. |

Add IP Address

Add a URL or IP address to the device's IP address list.

| Field | Value(s) | Description |
|---|---|---|
| MC | 0x0207 | Add IP Address |
| MD[1] | Flag | Bit field:<br>Bit-0: Connection Mode.<br>0 = UDP connection<br>1 = TCP connection<br>Bit-1: Unused<br>Bit-2: Unused<br>Bit-3: Unused<br>Bit-4: Unused<br>Bit-5: Source of Entry<br>0 = IDE generated<br>1 = NetLinx Language generated<br>Bit-6: Unused<br>Bit-7: Unused |
| MD[2 . . . 3] | Port Number | Unsigned 16-bit value containing the port number to connect (normally 1319). |
| MD[4 . . . n] | URL | Null terminated address string. Either a URL, or IP address in the form of "192.168.26.148" |

Delete IP Address

Delete one or all URLs or IP addresses from the device's IP address list.

| Field | Value(s) | Description |
|---|---|---|
| MC | 0x0208 | Delete IP Address |
| MD[1] | DeleteFlag | Bit field:<br>Bit 0 - It set, delete all URLs.<br>Bit 1 - Unused.<br>Bit 2 - Unused.<br>Bit 3 - Unused.<br>Bit 4 - Unused.<br>Bit 5 - Unused.<br>Bit 6 - Unused.<br>Bit 7 - Unused. |
| MD[2] | Flag | Bit field:<br>Bit-0: Connection Mode.<br>0 = UDP connection<br>1 = TCP connection<br>Bit-1: Unused<br>Bit-2: Unused<br>Bit-3: Unused<br>Bit-4: Unused<br>Bit-5: Source of Entry<br>0 = IDE generated<br>1 = NetLinx Language generated<br>Bit-6: Unused<br>Bit-7: Unused |

-continued

| Field | Value(s) | Description |
|---|---|---|
| MD[3 . . . 4] | Port Number | Unsigned 16-bit value containing the port number to connect (normally 1319). |
| MD[5 . . . n] | URL | Null terminated address string. Either a URL, or IP address in the form of "192.168.26.148" |

Set DNS IP Addresses

Set the IP address(es) of the DNS servers and the domain name. A maximum of three (3) IP addresses may be specified. The search order is same as the order provided. A NULL must be provided for empty entries.

| Field | Value(s) | Description |
|---|---|---|
| MC | 0x0209 | Set DNS IP Address |
| MD[1 . . . n] | Domain Name | Null terminated name string. This name gets appended to names without a dot. Example, "amx.com" |
| MD[n + 1 . . . p] | DNS IP Address1 | Null terminated address string. Must be the IP address in dot notation form (e.g. "192.168.25.5") |
| MD[p + 1 . . . q] | DNS IP Address2 | Null terminated address string. Must be the IP address in dot notation form (e.g. "12.5.138.7") |
| MD[q + 1 . . . r] | DNS IP Address3 | Null terminated address string. Must be the IP address in dot notation form. |

Request DNS IP Addresses

Request the IP address(es) of the DNS servers and the domain name of a device.

| Field | Value(s) | Description |
|---|---|---|
| MC | 0x020A | Requests the device's DNS IP Address List |

Get DNS IP Addresses

Get the IP address(es) of the DNS servers and the domain name.

| Field | Value(s) | Description |
|---|---|---|
| MC | 0x020B | Get DNS IP Address |
| MD[1 . . . n] | Domain Name | Null terminated name string. This name gets appended to names without a dot. Example, "amx.com" |
| MD[n + 1 . . . p] | DNS IP Address1 | Null terminated address string. Must be the IP address in dot notation form (e.g. "192.168.25.5") |
| MD[p + 1 . . . q] | DNS IP Address2 | Null terminated address string. Must be the IP address in dot notation form (e.g. "12.5.138.7") |
| MD[q + 1 . . . r] | DNS IP Address3 | Null terminated address string. Must be the IP address in dot notation form. |

Set Ethernet IP Address

Set the IP address, subnet mask, and gateway of the unit's Ethernet interface. A NULL must be provided for empty entries.

| Field | Value(s) | Description |
|---|---|---|
| MC | 0x020C | Set Ethernet IP Address |
| MD[1] | Flags | Bit field:<br>Bit 0 - If set, use DHCP for IP address and subnet mask. The IP address and subnet mask fields must be supplied, but are ignored.<br>Bit 1 - Unused.<br>Bit 2 - Unused.<br>Bit 3 - Unused.<br>Bit 4 - Unused.<br>Bit 5 - Unused.<br>Bit 6 - Unused.<br>Bit 7 - Unused. |
| MD[2 . . . n] | Host Name | Null terminated host name string. (e.g. "NetLinx1") |
| MD[n + 1 . . . p] | IP Address | Null terminated address string. Must be the IP address in dot notation form (e.g. "192.168.26.26") |
| MD[p + 1 . . . q] | Subnet Mask | Null terminated address string. Must be the IP address in dot notation form (e.g. "255.255.255.0") |
| MD[q + 1 . . . r] | Gateway | Null terminated address string. Must be the IP address in dot notation form (e.g. "192.168.26.2"). |

Request Ethernet IP Address

Request the device's Ethernet interface IP address, subnet mask, and gateway of the unit's Ethernet interface. The response to this message is the Get Ethernet IP Address message.

| Field | Value(s) | Description |
|---|---|---|
| MC | 0x020D | Request Ethernet IP Address |

Get Ethernet IP Address

Get the IP address, subnet mask, and gateway of the unit's Ethernet interface.

| Field | Value(s) | Description |
|---|---|---|
| MC | 0x020E | Get Ethernet IP Address |
| MD[1] | Flags | Bit field:<br>Bit 0 - It set, use DHCP for IP address and subnet mask. The IP address and subnet mask fields must be supplied, but are ignored.<br>Bit 1 - Unused.<br>Bit 2 - Unused.<br>Bit 3 - Unused.<br>Bit 4 - Unused.<br>Bit 5 - Unused.<br>Bit 6 - Unused.<br>Bit 7 - Unused. |
| MD[2 . . . n] | Host Name | Null terminated host name string. (e.g. "NetLinx1") |
| MD[n + 1 . . . p] | IP Address | Null terminated address string. Must be the IP address in dot notation form (e.g."192.168.25.5") |
| MD[p + 1 . . . q] | Subnet Mask | Null terminated address string. Must be the IP address in dot notation form (e.g. "255.255.255.0") |
| MD[q + 1 . . . r] | Gateway | Null terminated address string. Must be the IP address in dot notation form (e.g. "192.168.26.2"). |

Set Time and Date
  Sets the Time and Date of the unit.

| Field | Value(s) | Description |
| --- | --- | --- |
| MC | 0x020F | Set Time & Date |
| MD[1...2] | Month | Month (1-12) |
| MD[3...4] | Day of Month | Day of Month (1-31) |
| MD[5...6] | Year | Year (1999-2099) |
| MD[7...8] | Hours | Hour (0-23) |
| MD[9...10] | Minutes | Minute (0-59) |
| MD[11...12] | Seconds | Seconds (0-59) |
| MD[13...14] | Day of Week | Day of week (0-6) 0 = Sunday |

Request Current Time and Date
  Request the device's current time and date. The response to this message is the Get Time and Date message.

| Field | Value(s) | Description |
| --- | --- | --- |
| MC | 0x0210 | Request Current Time and Date |

Get Time and Date
  Gets the devices time and date.

| Field | Value(s) | Description |
| --- | --- | --- |
| MC | 0x0211 | Get Time & Date |
| MD[1...2] | Month | Month (1-12) |
| MD[3...4] | Day of Month | Day of Month (1-31) |
| MD[5...6] | Year | Year (1999-2099) |
| MD[7...8] | Hours | Hour (0-23) |
| MD[9...10] | Minutes | Minute (0-59) |
| MD[11...12] | Seconds | Seconds (0-59) |
| MD[13...14] | Day of Week | Day of week (0-6) 0 = Sunday |

Restart
  Restart the device or a subset of the device.

| Field | Value(s) | Description |
| --- | --- | --- |
| MC | 0x0212 | Restart |
| MD[1...2] | Flag | This field has the following enumerated meanings:<br>0 - Device reboot. The device should perform the "coldest" boot possible.<br>1 - NetLinx restart. Shutdown and restart the NetLinx interpreter.<br>65535 - Smart reboot. The device should perform the necessary steps to activate any previous configuration parameters. Including, but not limited to, "cold" rebooting the device. For example, if the IP address configuration has changed, and a reboot is required to begin using the new IP, then the device should reboot. |

Completion Code
  Indicates successful/unsuccessful completion of a previous message. In the case where the device settings, such as device number, are being modified, the completion code message is generate using the "old" device information before the new settings take effect.

| Field | Value(s) | Description |
| --- | --- | --- |
| MC | 0x0213 | Completion Code |
| MD[1...2] | wMessage | The message code (not Message ID) of the message (command) that is completed. For example, when a Set Ethernet IP Address message has been processed by a device, the device responds with a Completion Code message with wMessage set to 0x020C. |
| MD[3] | bStatus | Bit field indicating success or failure of the specified message:<br>Bit 0: 0 = Failed, 1 = success<br>Bits 1-7 must be zero. |

Set Identify Mode/Address Response
  Indicates that the device has received the Identify Mode/Address Enable and has had a button pressed on the device to indicate it should take on the ID Mode device and system number.

| Field | Value(s) | Description |
| --- | --- | --- |
| MC | 0x0282 | Set Identify mode/address response |
| MD[1...2] | Old Device | Unsigned 16-bit value. Old device number. |
| MD[3...4] | Old System | Unsigned 16-bit value. Old system number. |

IP Port Connection Manager
  The following messages originate from or are destined for the IP Port Connection Manager:

| Command | Value | Description |
| --- | --- | --- |
| ReqIPConnection (Device->Master) | 0x0381 | Requests an IP connection. |
| Request IP Connection Status (Device->Master) | 0x0382 | Requests the status of an active or pending connection. |
| IP Connection Status (Master->Device) | 0x0303 | Indicates the current status of a connection or connection request. Indicates: success, failure, unexpected closing, Host terminated connection, etc. |
| Authenticate Connection (From Master) | 0x0304 | This message is the challenge that is sent to the client device. |
| Authentication Response (To Master) | 0x0385 | Encrypted challenge response from the client. |
| Connection Granted/Failed (From Master) | 0x0306 | Status back to the client regarding the connection. |

The included message protocol and its packet are designed to be sent independent of any transport protocol. Thus, this message can be sent by a TCP/IP protocol over any connection or by a lontalk protocol, which is based on the phastlink protocol developed by AMX Corporation. This protocol can also be carried over on RS232/PPP connections. This protocol supports master to master, PC to master and PC to device communication.
  Communication components are usually represented using the seven-layer ISO model. Operating Systems such as Windows NT/9x provide most of these layers with a powerful object oriented abstraction at the application layer. Under Windows, at the application layer, the software developer is presented with a Berkley Sockets interface. With this interface, the developer can establish two-way communication using an object known as a "Socket". Applications can choose to be clients or servers. Though this is a powerful abstraction, there is no facility to help the application developer formulate a protocol in terms of the packets of information sent back and forth on the wire. The services that are available deal with namespace resolution and sending and receiving of blocks of binary data. Typically, the client and server portions of the application are written to understand each other's messages on the wire. The messages consist of structures of binary information. To formulate such messages, the developer usually has to program in a low-level language such as C or C++.

The Internet has given rise to a whole new species of developers called "Web developers". On an average, they are not low-level programmers who can code in C or C++ and instead use some combination of HTML, Java, JavaScript and VBScript. Except for the full Java language, the other languages are "scripting languages".

They do not provide the developer with services and facilities of a full programming language.

The primary goal of the AMX Corporation dynamic messaging components invention is to make a scripting language such as VBScript or JavaScript (or even Visual Basic) capable of directly communicating on any TCP/IP network connection. This means that these dynamic messaging components have to give the script writer the ability to: (i) form binary messages and transmit them on a network connection; and (ii) receive binary messages from a network connection, understand their format and "unpack" them to extract individual fields in the message. As explained later in this document, it will be seen that apart from these two basic requirements, current communication protocols require more complex features that these components now provide.

To meet the primary goal explained above, the dynamic messaging components were chosen to be implemented using the Microsoft Component Object Model or COM. This is primarily because presently no other programming model allows a scripting language to use self-describing objects with such ease of use. COM objects are well-understood by the developer community and the model is mature and stable. However, other suitable programming models may be used if desired.

To effect the requirements enumerated above, three distinct objects or components are provided. They include a binary message descriptor/layout manager object, a message instance object that represents one network message, and a transport object that manages the buffered network transmission issues.

The message descriptor/layout manager object allows a script to define the structure of binary messages that represent packets of information sent back and forth on a network connection. The message structures are identified using unique names. Once defined, these structures can later be used to form instances of messages or define more complex structures, which contain embedded structures in them. Referring to FIG. 11 for an example of the message descriptor/layout manager object, which includes a binary message structure 700 that may be sent or received according to the communication protocol. The packet structure includes a message header structure that is an embedded structure within the message. The message header includes a packet protocol identifier (2 bytes) 702, a packet size in bytes (4 bytes) 703, a packet version (2 bytes) 704, and a packet type (2 bytes) 705. Message structure 700 further includes a message body, which contains data according to the message type. For example, the message body may include an element 1 (2 bytes) 705, an element 2 (a variable length element whose size is specified by element 1) 707, and an element 3 which is a NULL terminated string.

To further describe this message structure, two additional message structures are defined: the message header and the entire message. The entire message contains the header structure as an embedded structure within itself. The following pseudo-code shows the general format of the description:

```
LayoutManager = CreateObject("LayoutManager")
LayoutManager.BeginDefineLayout("PacketHeader")
    LayoutManager.AddPrimitive("SHORT", "Protocol")
    LayoutManager.AddPrimitive("LONG", "PacketSize")
    LayoutManager.AddPrimitive("SHORT", "PacketVersion")
    LayoutManager.AddPrimitive("SHORT", "PacketType")
LayoutManager.EndDefineLayout( )
LayoutManager.BeginDefineLayout("HelloWorldPacket")
    // message header
    LayoutManager.AddStruct("PacketHeader", "Header")
    // message body
    LayoutManager.AddPrimitive("SHORT", "Element1")
    LayoutManager.AddPrimitiveDynamicArray("CHAR",
    "Element2", "Element1")
    LayoutManager.AddSZString( "Element3")
LayoutManager.EndDefineLayout( )
```

The operations (methods) that the layout manager provides allow a script to define the individual components of a binary message. The operations generally take the form:

```
<Object>.<Operation Name> (<Element Type>, <Element Name>,
<Other Arguments . . . >)
```

For example, to add the "PacketSize" element to the message, the "AddPrimitive" operation is used. The element type is specified as "LONG" meaning it is an integer 4 bytes in size. Adding elements to a message has to be done within a "BeginDefineLayout-EndDefineLayout" pair of operations. This indicates to the layout manager when a new message structure definition begins and ends. Once a message structure is defined completely, it may be used as an element type in further message definitions. In the example above, the "AddStruct" operation was used to make "Packet Header Structure" an element in the structure definition of message "Packet Type 1". Embedding structures within structures allows for definition of very complex messages.

The example also illustrated yet another important concept. This is the ability to define variable length elements within a message structure. The element named "element 2" is of variable length. It is a byte (char) array whose length is specified within the message by the preceding element named "element 1". Dynamically sized elements of this type are pretty common in many communication protocols.

Due to their very nature, some dynamically sized elements do not have to have an explicit element specify their size. An example of such an element type is a NULL terminated string. A NULL terminated string is a sequence of bytes in which the byte value of 0 is a special value indicating the end of the sequence. Since the end of the sequence is specified by this special value, its length does not have to be explicitly stored. The example shows that "element 3" is a NULL terminated string and the operation "AddSZString" is used to add it.

The following examples enumerate the operations (methods) provided by the layout manager.

Message Descriptor/Layout Manager Object Methods

BeginDefineLayout—starts definition of a new message (cannot be called while already defining a message).

EndDefineLayout—ends definition of a current message (cannot be called if not currently defining a message).

IsDefinedLayout—checks for existence of a message definition and returns TRUE/FALSE.

AddPrimitive—adds a primitive element to a message structure. Primitive elements form the basic entities of a binary message. Primitive elements includes characters (1 byte), 2 byte integers, 4 byte integers, floating point numbers (4 bytes) and double precision floating point numbers (8 bytes).

AddPrimitiveArray—adds an array of primitive elements to a message structure.

AddPrimitiveDynamicArray—adds a dynamic array of primitive elements to a message structure. The array does not have to be fixed in size, rather, the name of another (integer type) element is used to contain the actual length of this element inside a specific instance of this message structure. The size element has to have been already defined within the message structure. In other words, the length of this dynamic element is specified by an element within the message and that element should be stored in a position physically above the dynamic element.

AddStruct—adds a structure element to a message structure. The structure element must already have been defined.

AddStructArray—adds an array of structure elements to a message structure.

AddStructDynamicArray—adds a dynamic array of structure elements to a message structure. The same rules as that of AddPrimitiveDynamicArray applies to this method.

AddSZString—adds a NULL terminated string element to a message structure.

AddSZStringArray—adds an array of NULL terminated string elements to a message structure. The array does not have to be fixed in length, rather, the last string element of the array has to be terminated with two NULL characters rather than one NULL character.

AddPadding—adds padding of specified byte amount to a message structure after an element. This method is used to align individual elements of a structure to be on specific byte boundaries.

AddAlignmentPadding—adds padding to a message structure after an element to align to the specified alignment boundary. Byte alignments can be made to occur on 2, 4, 8 or 16 byte boundaries. This method is used to align individual elements on specific byte boundaries when the element sizes are not fixed. The message instance object of the dynamic messaging component allows a script to create an instance of a previously defined message in memory, fill the message with values for the individual fields of the message, and then with the help of transport object (which is described in the next section), transmit the message over a network connection. The message instance object also allows a script to receive an instance of a message over a network connection, unpack the message and access the values of the individual elements in the message.

Figure 12:
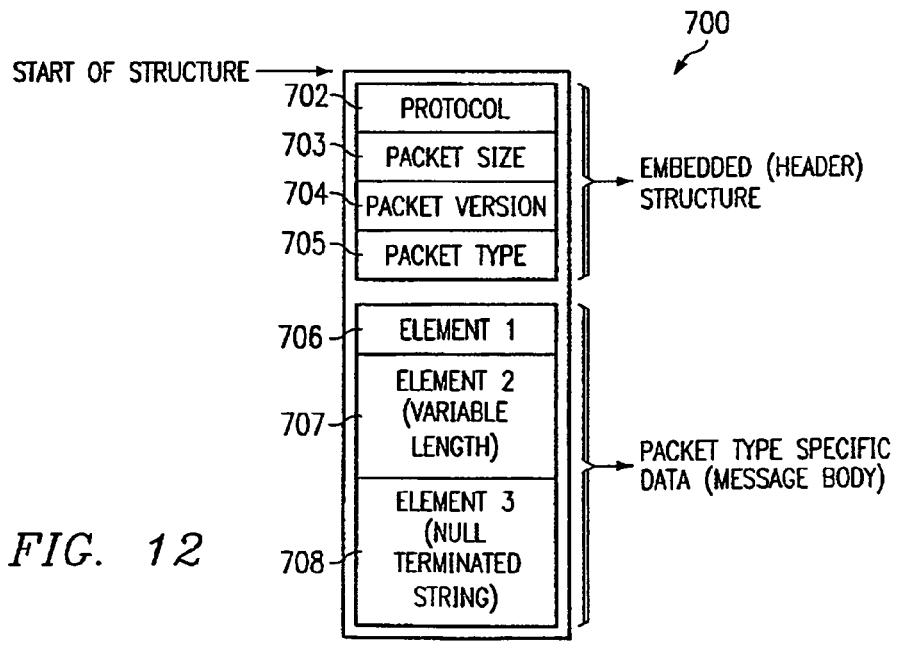
FIG. 12 is an exemplary message structure in accordance to teaching the present invention.

The message structure previously defined will be used again to show how an instance of that message could be created in memory. FIG. 12 illustrates an instance of the message whose structure was described in the previous section. Message 720 includes a message header that has the following exemplary values: packet protocol identifier=1 (722); packet size in bytes=23 (723); packet version=1 (724); and packet type=3 (725). The message body may contains the following elements: element 1=5 (size of following dynamic array in bytes) (726); element 2=[hello] (array of 5 characters) (727); and element 3="world.backslash.0" (NULL.backslash.0 terminated string) (728).

The following pseudo-code shows a typical sequence in creating the message instance:

```
MessageInstance = CreateObject ("LayoutInstance")
// (1) create message of type "HelloWorldPacket" - previously
defined using Layout Manager
MessageInstance.CreateMessage("HelloWorldpacket", FALSE)
// (2) setup length of dynamic fields
MessageInstance.SetDynamicArraySize("Element2",
StringLength("Hello"))
MessageInstance.SetSZStringLength("Element3", 0, StringLength
("World"))
// (3) set values for elements
MessageInstance.BeginSetLayout( )
    // setup message header fields
    MessageInstance.SetInt2("PacketHeader.Protocol", 1)
    MessageInstance.SetInt4("PacketHeader.PacketSize",
MessageInstance.GetMessageSize( ))
    MessageInstance.SetInt2("PacketHeader.PacketVersion", 1)
    MessageInstance.SetInt2("PacketHeader.PacketType", 3)
    // setup message body fields
    MessageInstance.SetInt2("Element1", StringLength("Hello"))
    // set dynamic array element (Element2)
    MessageInstance.SetCharArray("Element2", StringLength("Hello"),
    "Hello")
    // set NULL terminated element (Element3)
    MessageInstance.SetSZString("Element3", "World")
MessageInstance.EndSetLayout( )
```

In the pseudo-code above, a message instance object is created which is then used to set the various values for the elements within the message. The code to actually transmit the message is described below.

The first operation performed is the "CreateMessage" operation. This operation allows a script to create a message of a given type. The message type is previously defined within this (or some other) script using the message descriptor/layout manager object. The meaning of the second boolean argument (FALSE in this case) is explained below. Following the creation of the message, two operations are performed to set the lengths of the two dynamic fields within the message. The two fields are "element 2" and "element 3". "element 2" is a dynamic array of characters and "element 3" is a NULL terminated string. After a message is created, sizes of all dynamic elements within the message have to be specified because that is how the Message Instance object knows how much memory this message will occupy. If there are no dynamic elements in the message, this step can be completely avoided.

The third step is actually setting the values of the various fields (elements) in the message. In this message, there are two parts: header and body. The various operations supported by the Message Instance object provide scripts extreme flexibility in writing values of elements into a message. In this instance, methods like "SetInt2", "SetInt4", "SetCharArray" and "SetSZString" are used. Also, once all dynamic elements have been explicitly sized, the Message Instance object knows what the entire size of the message is, so the "GetMessageSize" operation can be used to get the size. This operation is used in writing the message size into the "PacketSize" element of the header. The sequence of set operations has to be enclosed within a pair of "BeginSetLayout-EndSetLayout" operations so that the Message Instance knows when a message is ready to be transmitted.

Now that a complete example of a message instance has been illustrated, the following section enumerates all the operations (methods) provided by the Message Instance.

The message/layout instance object includes the following methods:

CreateMessage—creates an instance of a message, given its type. Optionally, this method can be used to transform a message of one type to another type.

SetDynamicArraySize—sets the size of a dynamic element inside a message.

SetSZStringLength—sets the length of a NULL terminated string. The string may be by itself an element in the message or could be part of a string array.

SetSZStringArraySize—sets the size of an array of strings in a message.

BeginSetLayout—notifies the message instance object that "Set" methods are about to be called which will write values to individual elements within the message.

SetChar—sets the value of a single byte (char) element.

SetInt2—sets the value of a 2-byte integer (short) element.

SetInt4—sets the value of a 4-byte integer (long) element.

SetFloat—sets the value of a floating point (4 byte) element.

SetDouble—sets the value of a double precision floating point (8 byte) element.

SetCharArray—copies an array of characters into an element.

SetSZString—copies a string into the NULL terminated string element.

EndSetLayout—notifies the Message Instance object that the message should now readied for transmission as all the individual element values have been set.

BeginGetLayout—notifies the Message Instance object that the message should be un-packaged so that individual elements can be "read" out of it.

GetChar—returns the value of a single byte (char) element.

GetInt2—returns the value of a 2-byte integer (short) element.

GetInt4—returns the value of a 4-byte integer (long) element.

GetFloat—returns the value of a floating point element.

GetDouble—returns the value of a double precision element.

GetCharArray—returns an array of chars from an char array element.

GetSZStringLength—returns the size of a NULL terminated string element in the message.

GetSZStringArraySize—returns the size of a string array in the message.

GetSZString—returns a string from the message.

EndGetLayout—notifies the Message Instance object that the script is done "reading" values out of the message.

ClearData—clears any message instance data within the object.

GetMessageSize—returns the size (in bytes) of the entire message instance.

Send—using an instance of the transport object, streams the message instance over a network connection.

Receive—using an instance of the transport object, receives a message instance from a network connection.

SetConvert—sets network to host and host to network byte swapping transformation mode. In this mode, all incoming messages are assumed to be in network format and all outgoing messages are converted to network format.

Pushback—allows for message overflow/underflow. When an incoming message is partially formed or contains more than a full message, the partial message bytes can be "pushed" back into the transport object which can be retrieved later.

Message layout and message instance creation are set forth above. The final step in network connectivity is the actual transport. Message layout and message instancing are actions that give rise to blocks of bytes in the memory of the web server (or wherever the script is being executed). To be able to communicate on a network, a live connection has to be made to be able to send and receive data. The third object inside the AMX Corporation dynamic messaging components module is a transport object implemented specifically to handle TCP/IP networks. The two previous objects do not in anyway assume what kind of a network connection they are communicating over. The transport object's interface is specified independent of the nature of the network. The transport object has a built-in asynchronous message handler that can fire scripts when messages arrive outside of a script's "Receive" method call.

Examples of the transport object methods includes:

Connect—connects to a given remote computer given its network address and end-point (port).

Close—closes an existing connection.

GetLastSocketError—returns the last error that occurred on the network connection.

SetScriptPath—Sets the path of the script that will be executed on incoming asynchronous messages.

DisableAsyncHandler—during some operations, it is desirable not to have the asynchronous message processor fire external scripts—this method allows a script to disable the asynchronous message processor, during which time all incoming messages are buffered up.

EnableAsyncHandler—enables the asynchronous message processor—from this point onward, every incoming asynchronous message will result in an external script being executed.

IsConnected—returns whether the transport object is connected to a remote computer or not.

GetHost—returns the network address of the remote computer to which the transport object is currently connected.

GetPort—returns the port on the remote computer to which the transport object is currently connected.

The sequence of operations to create and send a message instance is given in the exemplary pseudo-code below:

```
// Create a transport object and connect it to a remote computer
Transport = CreateObject("Transport")
Transport.Connect("abc.com", 10000)
MessageInstance = CreateObject("LayoutInstance")
// create message of type "HelloWorldPacket" - previously defined using Layout Manager
MessageInstance.CreateMessage("HelloWorldPacket", FALSE)
// setup length of dynamic fields
MessageInstance.SetDynamicArraySize("Element2",
StringLength("Hello"))
MessageInstance.SetSZStringLength("Element3", 0, StringLength("World"))
// set values for elements
MessageInstance.BeginSetLayout ( )
    // setup message header fields
    MessageInstance.SetInt2("PacketHeader.Protocol", 1)
    MessageInstance.SetInt4("PacketHeader.PacketSize",
MessageInstance.GetMessageSize( ))
    MessageInstance.SetInt2("PacketHeader.PacketVersion", 1)
    MessageInstance.SetInt2("PacketHeader.PacketType", 3)
    // setup message body fields
    MessageInstance.SetInt2("Element1", StringLength("Hello"))
    // set dynamic array element (Element2)
    MessageInstance.SetCharArray("Element2", StringLength("Hello"),
```

-continued

```
"Hello")
// set NULL terminated element (Element3)
    MessageInstance.SetSZString("Element3", "World")
MessageInstance.EndSetLayout( )
// transmit message instance using the transport object "Transport"
MessageInstance.Send(Transport)
```

The dynamic messaging components are used in the communication between the ASP-based web server and the Internet appliance server. The various web pages that deal with controlling and administering the Internet appliance server use these objects to create and send TCP/IP messages to the IA server.

Although several embodiments of the present invention and their advantages have been described in detail, it should be understood that mutations, changes, substitutions, transformations, modifications, variations, and alterations can be made therein without departing from the teachings of the present invention, the spirit and scope of the invention being set forth by the appended claims.

The invention claimed is:

1. A method for communicating control information in a control system, wherein the control system includes a control area network, a master controller and a plurality of devices, each of said plurality of devices having a number of channels, each channel having an identifying number and a plurality of channel states, said master controller and said plurality of devices being in communication with said control area network, the method comprising:
at least initially directing one or more messages sent to and from each device to said master controller;
sending a first type of control message from said master controller to respective devices, wherein a control message of said first type directs the respective device to place one of its channels in a specified channel state;
sending a second type of control message and a third type of control message from said master controller to respective devices, wherein a control message of said second type directs the respective device to set the level of a specified parameter to a certain value, and a control message of said third type comprises a character string of variable length;
sending a fourth type of control message comprising a command from said master controller to a controlling device, wherein at least one of said plurality of devices comprises said controlling device configured to regulate the operation of a controlled device; and
temporarily assigning a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

2. The method of claim 1, wherein all messages sent to and from each device are at least initially directed to said master controller.

3. The method of claim 2, further comprising converting the character string of said third type of control message to a format supported by one of said plurality of devices configured to receive said character string.

4. The method of claim 3, further comprising inserting control messages of one or more of said control message types as respective control message components into a packet, in accordance with a specified protocol, for transmission between said master controller and one of said plurality of devices.

5. The method of claim 1, further comprising said master controller periodically querying respective devices to monitor availability of respective devices for communication of information.

6. The method of claim 2, wherein each of said plurality of devices includes an identification number and one or more ports, each of said ports having an identification number and one or more channels.

7. The method of claim 6, further comprising said master controller rendering a channel of a first device into an input state to receive an input from said first device;
and said master controller rendering a channel of a second device into an output state to send said input received from said first device as an output to said second device.

8. The method of claim 7, wherein each of said channels is configured to indicate a specific function, parameter or property of its corresponding device.

9. The method of claim 6, wherein a message sent between said master controller and one of said plurality of devices includes an address indicating the identification number of the one of said plurality of devices, and of the port and channel thereof originating or receiving the message.

10. The method of claim 2, wherein said master controller is configured to exchange messages between respective devices of said control area network and the Internet.

11. The method of claim 10, wherein said master controller comprises at least one from the group consisting of a device manager, a diagnostic manager, a configuration manager and an IP port connection manager.

12. A control system comprising:
a control area network;
a master controller;
a plurality of devices, wherein each of said plurality of devices is configured with a plurality of channels, each channel having an identification number and a plurality of channel states; and
wherein said master controller and said plurality of devices are in communication with said control area network, said control system is configured to:
at least initially direct one or more messages sent to and from each device to said master controller, said master controller is configured to send a first type of control message, a second type of control message and a third type of control message to respective devices, each device is configured to receive the first type of control message, the second type of control message and the third type of control message such that the first type of control message directs the respective device to place one of its channels in a specified channel state, the second type of control message directs the respective device to set the level of a specified parameter to a certain value, the third type of control message directs the respective device to receive a character string of variable length;
send a fourth type of control message comprising a command from said master controller to a controlling device, wherein at least one of said plurality of devices comprises said controlling device configured to regulate the operation of a controlled device; and
temporarily assign a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

13. The control system of claim 12, wherein all messages sent to and from each device are at least initially directed to said master controller.

14. The control system of claim 13, wherein said character string of said third type of control message is converted to a format supported by at least one of said plurality of devices configured to receive said character string.

15. The control system of claim 13, wherein each of said plurality of devices includes an identification number and one or more ports, each of said ports having an identification number and one or more channels.

16. The control system of claim 15, wherein said master controller is configured to render a channel of a first device into an input state to receive an input from said first device, and is further configured to render a channel of a second device into an output state to send said input received from said first device as an output to said second device.

17. The control system of claim 13, wherein said master controller is coupled to exchange messages between respective devices of said control area network and the Internet.

18. The control system of claim 17, wherein said master controller comprises a plurality of managers.

19. The control system of claim 18, wherein said managers comprise at least one from the group consisting of a device manager, a diagnostic manager, a configuration manager and an IP port connection manager.

20. A control system comprising:
a control area network;
a master controller;
a plurality of devices, wherein each of said plurality of devices is configured with a plurality of channels, each channel having an identification number and a plurality of channel states; and
wherein said master controller and said plurality of devices are in communication with said control area network, said control system is configured to:
at least initially direct one or more messages sent to and from at least one device to said master controller, said master controller is configured to send a control message to one of said plurality of devices, said one of said plurality of devices being configured upon receipt of said control message to perform at least one of placing one of said plurality of channels of said one of said plurality of devices in a specified channel state, setting the level of a specified parameter to a certain value, and receiving a character string of variable length;
send a fourth type of control message comprising a command from said master controller to a controlling device, wherein at least one of said plurality of devices comprises said controlling device configured to regulate the operation of a controlled device; and
temporarily assign a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

21. A computer program product embedded in a computer-readable storage medium for communicating control information in a control system, wherein the control system includes a control area network, a master controller and a plurality of devices, each of said plurality of devices having a number of channels, each channel having an identifying number and a plurality of channel states, said master controller and said plurality of devices being in communication with said control area network, the computer program product comprising:
a first computer code for at least initially directing one or more messages sent to and from each device to said master controller;
a second computer code for sending a first type of control message from said master controller to respective devices, wherein a control message of said first type directing the respective device to place one of its channels in a specified channel state; and
a third computer code for sending a second type of control message and a third type of control message from said master controller to respective devices, wherein the second type of control message directs the respective device to set the level of a specified parameter to a certain value, and the third type of control message comprises a character string of variable length;
a fourth computer code for sending a fourth type of control message comprising a command from said master controller to a controlling device, wherein at least one of said plurality of devices comprises said controlling device configured to regulate the operation of a controlled device; and
a fifth computer code for temporarily assigning a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

22. The computer program product of claim 21, wherein all messages sent to and from each device are at least initially directed to said master controller.

23. The computer program product of claim 22, further comprising a sixth computer code for converting said character string of said third type of control message to a format supported by at least one of said plurality of devices configured to receive said character string.

24. The computer program product of claim 23, further comprising a seventh computer code for inserting control messages of one or more of said control message types as respective control message components into a packet, in accordance with a specified protocol, for transmission between said master controller and one of said plurality of devices.

25. The computer program product of claim 21, further comprising a sixth computer code for said master controller periodically querying respective devices to monitor availability of respective devices for communication of information.

26. The computer program product of claim 22, wherein each of said plurality of devices includes an identification number and one or more ports, each of said ports having an identification number and one or more channels.

27. The computer program product of claim 26, further comprising a sixth computer code for rendering a channel of a first device into an input state to receive an input from said first device, and a seventh computer code for rendering a channel of a second device into an output state to send said input received from said first device as an output to said second device.

28. The computer program product of claim 27, wherein each of said channels is configured to indicate a specific function, parameter or property of its corresponding device.

29. The computer program product of claim 26, wherein a message sent between said master controller and one of said plurality of devices includes an address indicating the identification numbers of the one of said plurality of devices, and of the port and channel thereof originating or receiving the message.

30. The computer program product of claim 22, wherein said computer program further comprising a sixth computer code for exchanging messages between respective devices of said control area network and the Internet.

31. The computer program product of claim 30, wherein said master controller comprises at least one from the group consisting of a device manager, a diagnostic manager, a configuration manager and an IP port connection manager.

32. A control system comprising:
- a control area network;
- a master controller;
- a plurality of devices, wherein each of said plurality of devices is configured with a plurality of channels, each channel having an identification number and a plurality of channel states, wherein said master controller and said plurality of devices are in communication with said control area network; and
- means for at least initially directing all messages sent to and from each device to said master controller;
- means for sending a first type of control message from said master controller to respective devices, wherein the first type of control message directs the respective device to place one of its channels in a specified channel state;
- means for sending a second type of control message and a third type of control message from said master controller to respective devices, wherein the second type of control message directs the respective device to set the level of a specified parameter to a certain value, and the third type of control message comprises a character string of variable length;
- means for sending a fourth type of control message comprising a command from said master controller to a controlling device, wherein at least one of said plurality of devices comprises said controlling device configured to regulate the operation of a controlled device; and
- means for temporarily assigning a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

33. A method for communicating control information in a control system, wherein the control system includes a control area network, a master controller and a plurality of devices, each of said plurality of devices having a number of channels, each channel having an identifying number and a plurality of channel states, said master controller and said plurality of devices being in communication with said control area network, said master controller being in communication with an IP data network, the method comprising:
- at least initially directing one or more messages sent to and from each device to said master controller;
- sending a first type of control message from said master controller to respective devices, wherein a control message of said first type directs the respective device to place one of its channels in a specified channel state;
- sending a second type of control message and a third type of control message from said master controller to respective devices, wherein a control message of said second type directs the respective device to set the level of a specified parameter to a certain value, and a control message of said third type comprises a character string of variable length;
- sending a fourth type of control message comprising a command from said master controller to a controlling device, wherein at least one of said plurality of devices comprises said controlling device configured to regulate the operation of a controlled device; and
- temporarily assigning a device identification number to one of said plurality of devices, wherein said device identification number is assigned by said master controller to enable communication of information between said one of said plurality of devices and said master controller, said one of said plurality of devices does not have a permanently assigned identification number, and is transparent to operation of said control system when the device identification number is not temporarily assigned thereto.

\* \* \* \* \*

UNITED STATES PATENT AND TRADEMARK OFFICE
CERTIFICATE OF CORRECTION

| | | |
|---|---|---|
| PATENT NO. | : 7,673,030 B2 | |
| APPLICATION NO. | : 11/601041 | |
| DATED | : March 2, 2010 | |
| INVENTOR(S) | : Thomas D. Hite et al. | |

It is certified that error appears in the above-identified patent and that said Letters Patent is hereby corrected as shown below:

In the Specification:

At column 47, line number 31, please remove the word [It] and replace with the word -- If --.

At column 50, line number 48, please remove the word [It] and replace with the word -- If --.

Signed and Sealed this
Second Day of August, 2011

David J. Kappos
*Director of the United States Patent and Trademark Office*